United States Patent
Huang et al.

(10) Patent No.: US 11,564,224 B1
(45) Date of Patent: Jan. 24, 2023

(54) METHOD AND APPARATUS FOR DETERMINING HYBRID AUTOMATIC REPEAT REQUEST (HARQ) CODEBOOK IN A WIRELESS COMMUNICATION SYSTEM

(71) Applicant: ASUSTek Computer Inc., Taipei (TW)

(72) Inventors: Chun-Wei Huang, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/849,310

(22) Filed: Jun. 24, 2022

Related U.S. Application Data

(60) Provisional application No. 63/215,190, filed on Jun. 25, 2021.

(51) Int. Cl.
  *H04W 72/04* (2009.01)
  *H04L 1/18* (2006.01)

(52) U.S. Cl.
  CPC ......... *H04W 72/044* (2013.01); *H04L 1/1861* (2013.01); *H04W 72/042* (2013.01)

(58) Field of Classification Search
  CPC .. H04W 72/044; H04W 72/042; H04L 1/1861
  See application file for complete search history.

(56) References Cited

U.S. PATENT DOCUMENTS

| | | | |
|---|---|---|---|
| 10,321,443 B2 | 6/2019 | Lee et al. | |
| 2019/0306841 A1* | 10/2019 | Huang | H04W 76/34 |
| 2022/0279456 A1* | 9/2022 | Babaei | H04W 52/146 |

OTHER PUBLICATIONS

Tech Invite, "Inside TS 38.300: Verticals Support," Oct. 14, 2020, p. 4, https://www.tech-invite.com/3m38/toc/tinv-3gpp-38-300_x.html (Year: 2020).*
3GPP TS 38.300 V17.0.0 (Mar. 2022), Mar. 2022, p. 132 (Year: 2022).*
3GPP TSG-RAN WG1 Meeting #104bis-e, R1-2103883, e-Meeting, Apr. 12-20, 2021, Moderator Summary #3 on HARQ-ACK Feedback Enhancements for NR Rel-17 URLLC/IIoT, ___ PAGES.

* cited by examiner

*Primary Examiner* — Maharishi V Khirodhar
*Assistant Examiner* — Kenneth P Hunt
(74) *Attorney, Agent, or Firm* — Cooper Legal Group LLC

(57) ABSTRACT

In an example, a User Equipment (UE) is configured with one or more first Physical Uplink Control Channel (PUCCH) resources on a primary cell (PCell) and configured with one or more second PUCCH resources on a secondary cell (SCell). The PCell and the SCell are associated with a PUCCH group. Before a first slot, the UE changes an active uplink (UL) bandwidth part (BWP) of a cell. The cell associated with the changing the active UL BWP is the PCell or the SCell. A first occasion of the PCell is before the changing the active UL BWP. A second occasion of the SCell is before the changing the active UL BWP. The first occasion and the second occasion are associated with the first slot. The UE determines whether or not to include Hybrid Automatic Repeat request (HARQ) information, associated with the second occasion, in a HARQ codebook based on whether or not the SCell, associated with transmitting the HARQ codebook, is the same as the cell associated with the changing the active UL BWP. The UE transmits, in the first slot and on the SCell, a PUCCH including the HARQ codebook.

20 Claims, 16 Drawing Sheets

METHOD AND APPARATUS FOR DETERMINING HYBRID AUTOMATIC REPEAT REQUEST (HARQ) CODEBOOK IN A WIRELESS COMMUNICATION SYSTEM

CROSS-REFERENCE TO RELATED APPLICATIONS

The present Application claims the benefit of U.S. Provisional Patent Application Ser. No. 63/215,190 filed on Jun. 25, 2021, the entire disclosure of which is incorporated herein in its entirety by reference.

FIELD

This disclosure generally relates to wireless communication networks, and more particularly, to a method and apparatus for determining Hybrid Automatic Repeat Request (HARQ) codebook in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE is configured with one or more first Physical Uplink Control Channel (PUCCH) resources on a primary cell (PCell) and configured with one or more second PUCCH resources on a secondary cell (SCell). In some examples, the SCell is a PUCCH-switching secondary cell (PUCCH-sSCell). The PCell and the SCell are associated with a PUCCH group. Before a first slot, the UE changes an active uplink (UL) bandwidth part (BWP) of a cell. The cell associated with the changing the active UL BWP is the PCell or the SCell. A first occasion of the PCell is before the changing the active UL BWP. A second occasion of the SCell is before the changing the active UL BWP. The first occasion and the second occasion are associated with the first slot. The UE determines whether or not to include Hybrid Automatic Repeat request (HARQ) information, associated with the second occasion, in a HARQ codebook based on whether or not the SCell, associated with transmitting the HARQ codebook, is the same as the cell associated with the changing the active UL BWP. The UE transmits, in the first slot and on the SCell, a PUCCH comprising the HARQ codebook.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.213

V16.5.0 (2021-03) 3rd Generation Partnership Project, Technical Specification Group Radio Access Network, NR, Physical layer procedures for control (Release 16); Chairman's Notes RAN1 #104b-e final (https://www.3gpp.org/ftp/tsg_ran/WG1_RL1/TSGR1_104b-e/Inbox/Chair_notes); Chair's Notes RAN1 #105-e v012 (https://www.3gpp.org/ftp/tsg_ran/WG1_RL1/TSGR1_105-e/Inbox/Chair_notes/Chair's %20Notes %20RAN1%23105-e%20v012.zip). The standards and documents listed above are hereby expressly incorporated by reference in their entirety.

Figure 1:
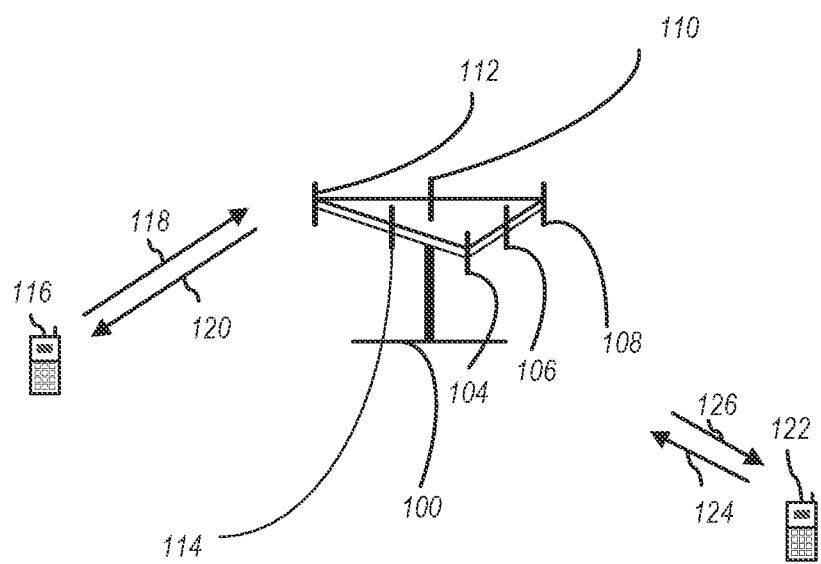
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
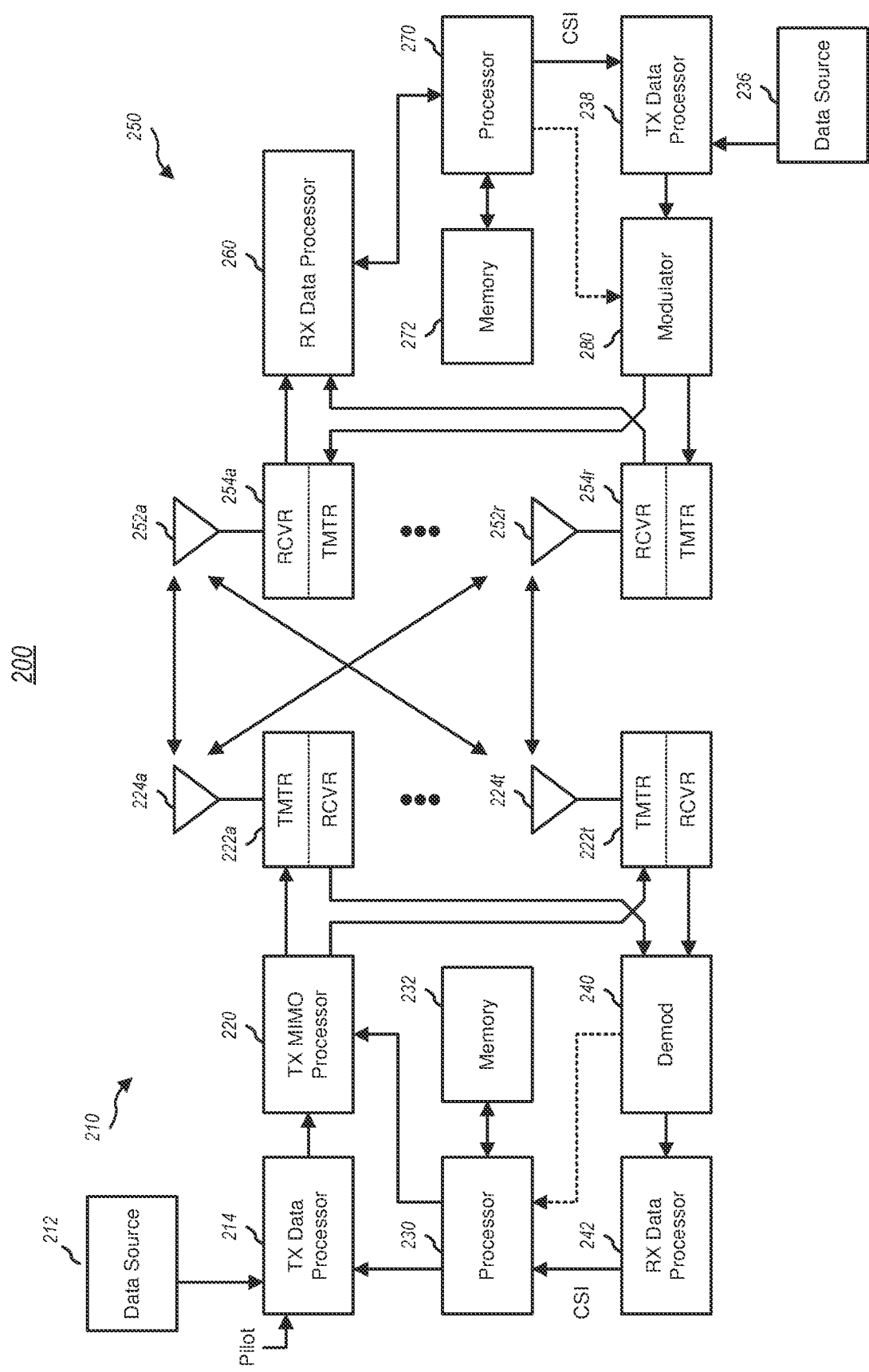
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
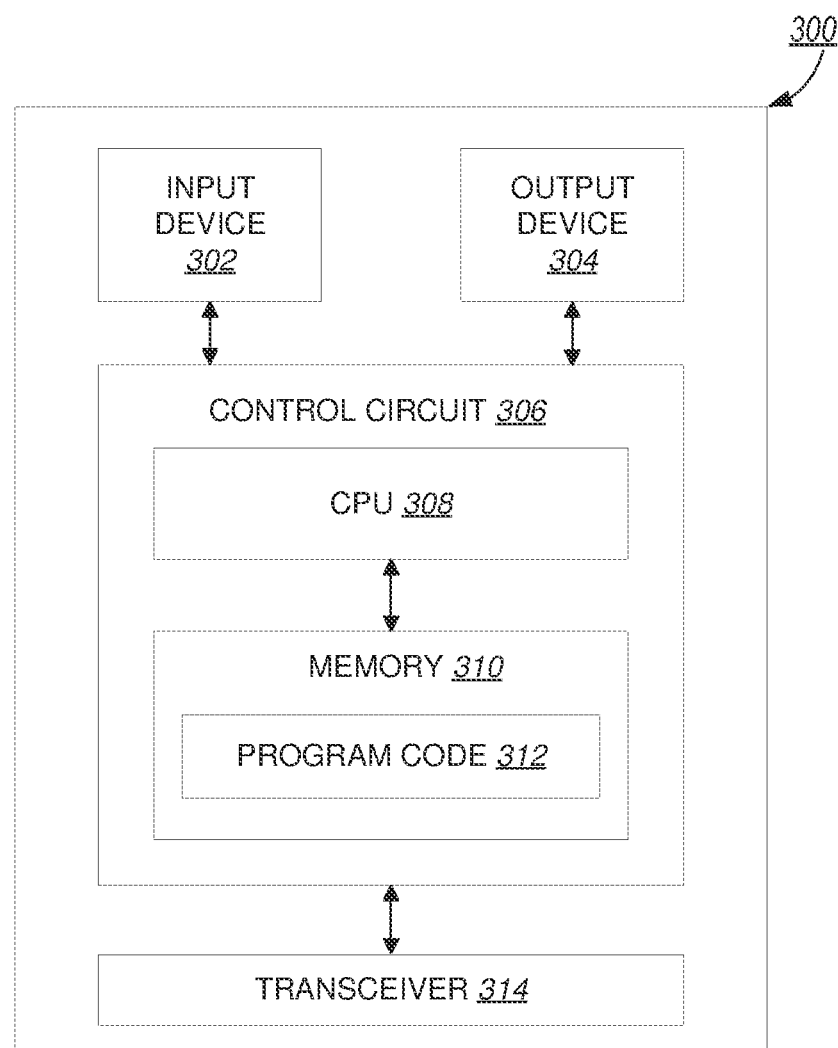
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
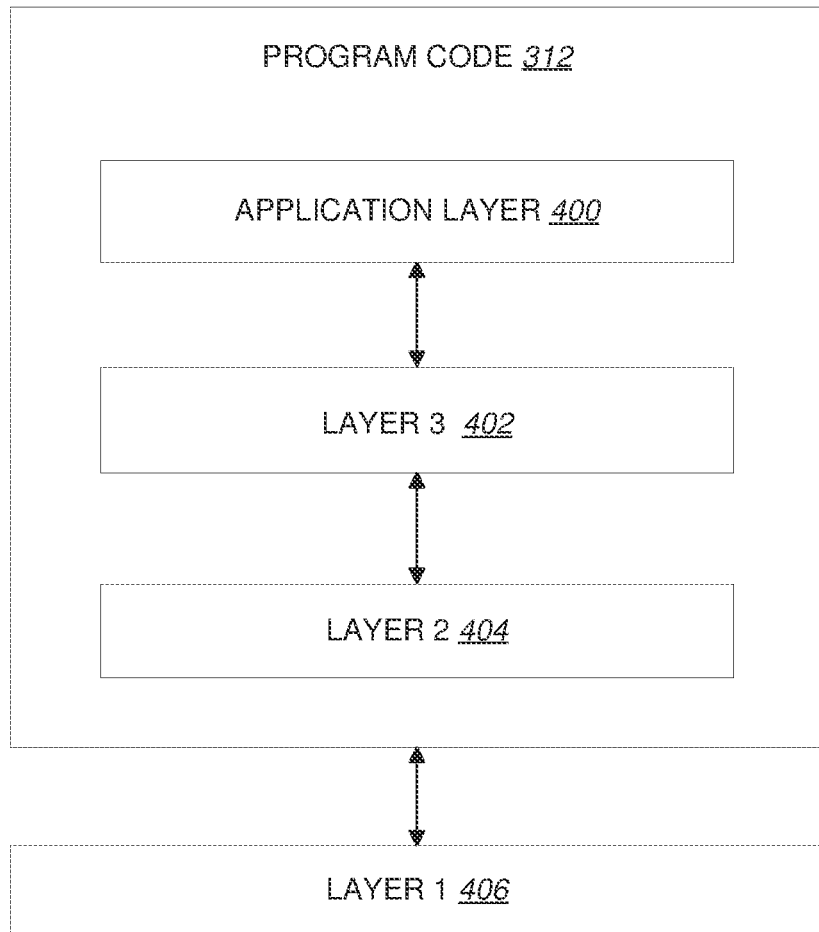
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Some Hybrid Automatic Repeat Request (HARQ) codebook determination procedures in NR are quoted below from 3GPP TS 38.213 V16.5.0. There are at least two types of HARQ codebooks, such as type-1 HARQ codebook and type-2 HARQ codebook. In some examples, HARQ codebook may also be referred to as HARQ-ACK codebook. Considering sidelink resource allocation mode-1 (e.g., network scheduling mode), a network may provide Physical Uplink Control Channel (PUCCH) configuration and/or may configure type-1 or type-2 codebook for a UE to transmit HARQ corresponding to sidelink transmission. Radio Resource Control (RRC) configured frame structure and/or transmit direction for one or more symbols are referenced. Text from 3GPP TS 38.213 V16.5.0 is quoted below:

9 UE Procedure for Reporting Control Information
If a UE is configured with a SCG, the UE shall apply the procedures described in this clause for both MCG and SCG.
  When the procedures are applied for MCG, the terms 'secondary cell', 'secondary cells', 'serving cell', 'serving cells' in this clause refer to secondary cell, secondary cells, serving cell, serving cells belonging to the MCG respectively.
  When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.
If a UE is configured with a PUCCH-SCell, the UE shall apply the procedures described in this clause for both primary PUCCH group and secondary PUCCH group
  When the procedures are applied for the primary PUCCH group, the terms 'secondary cell', 'secondary cells', 'serving cell', 'serving cells' in this clause refer to secondary cell, secondary cells, serving cell, serving cells belonging to the primary PUCCH group respectively.
  When the procedures are applied for secondary PUCCH group, the terms 'secondary cell', 'secondary cells', 'serving cell', 'serving cells' in this clause refer to secondary cell, secondary cells (not including the PUCCH-SCell), serving cell, serving cells belonging to the secondary PUCCH group respectively. The term 'primary cell' in this clause refers to the PUCCH-SCell of the secondary PUCCH group.
. . .

9.1.2.1 Type-1 HARQ-ACK Codebook in Physical Uplink Control Channel
For a serving cell c, an active DL BWP, and an active UL BWP, as described in clause 12, the UE determines a set of $M_{A,c}$ occasions for candidate PDSCH receptions for which the UE can transmit corresponding HARQ-ACK information in a PUCCH in slot $n_U$ . . . . The determination is based:
  a) on a set of slot timing values $K_1$ associated with the active UL BWP
    If the UE is configured to monitor PDCCH for DCI format 1_1 and is not configured to monitor PDCCH for DCI format 1_2 for serving cell c, $K_1$ is provided by dl-DataToUL-ACK
  . . .
  For the set of slot timing values $K_1$, the UE determines a set of $M_{A,c}$ occasions for candidate PDSCH receptions or SPS PDSCH releases according to the following pseudo-code. A location in the Type-1 HARQ-ACK codebook for HARQ-ACK information corresponding to a single SPS PDSCH release is same as for a corresponding SPS PDSCH reception.
  Set j=0—index of occasion for candidate PDSCH reception or SPS PDSCH release
  Set B=ø
  Set $M_{A,c}$=ø
  Set $C(K_1)$ to the cardinality of set $K_1$
  Set k=0—index of slot timing values $K_{1,k}$, in descending order of the slot timing values, in set $K_1$ for serving cell C
  If a UE is not provided ca-SlotOffset for any serving cell of PDSCH receptions and for the serving cell of corresponding PUCCH transmission with HARQ-ACK information while k < C{$K_1$}
  if mod {$n_U - K_{1,k}$ +1,max($2^{\mu_{UL}-\mu_{DL}}$,1))= 0
    Set $n_D$ = 0-index of a DL slot within an UL slot
    while $n_D$ < max($2^{\mu_{DL}-\mu_{UL}}$,1)
      Set R to the set of rows
      Set C(R) to the cardinality of R
      Set r = 0-index of row in set R
      if slot $n_U$ starts at a same time as or after a slot for an active DL BWP change on serving cell c or an active UL BWP change on the PCell and slot $\lfloor(n_U - K_{1,k}) \cdot 2^{\mu_{DL}-\mu_{UL}}\rfloor + n_D$ is before the slot for the active DL BWP change on serving cell c or the active UL BWP change on the PCell
        $n_D = n_D + 1$;

```
    else
        while r < C(R)
            if the UE is provided tdd-UL-DL-ConfigurationCommon, or tdd-UL-DL-
              ConfigurationDedicated and, for each slot from slot ⌊(n_U − K_{1,k})·2^{μDL−μUL}⌋ + n_D −
              N_PDSCH^{repeat,max} + 1 to slot ⌊(n_U − K_{1,k})·2^{μDL−μUL}⌋ + n_D, at least one symbol of the
              PDSCH time resource derived by row r is configured as UL where K_{1,k} is the k-th slot
              timing value in set K_1,
                R = R\r;
            else
                r = r + 1;
            end if
        end while
        if the UE does not indicate a capability to receive more than one unicast PDSCH per slot and
          R ≠ ∅,
            M_{A,c} = M_{A,c} ∪ j;
            j = j + 1;
        else
            Set C(R) to the cardinality of R
            Set m to the smallest last OFDM symbol index, as determined by the SLIV, among all
              rows of R
            while R ≠ ∅,
                Set r = 0
                while r < C(R)
                    if S ≤ m for start OFDM symbol index S for row r
                        b_{r,k,n_D} = j; -index of occasion for candidate PDSCH reception or SPS PDSCH
                          release associated with row r
                        R = R\r;
                        B = B ∪ b_{r,k,n_D};
                    else
                        r = r + 1;
                    end if
                end while
                M_{A,c} = M_{A,c} ∪ j;
                j = j + 1;
                Set m to the smallest last OFDM symbol index among all rows of R ;
            end while
        end if
        n_D = n_D + 1;
    end if
    end while
  end if
  k = k + 1;
end while
else
...
end if
```

If the UE indicates a capability to receive more than one PDSCH per slot, for occasions of candidate PDSCH receptions corresponding to rows of R associated with a same value of $b_{r,k,n_D}$, where $b_{r,k,n_D} \in B$, the UE does not expect to receive more than one PDSCH in a same DL slot.

...

A UE determines $\tilde{o}_0^{ACK}, \tilde{o}_1^{ACK}, \ldots, \tilde{o}_{O_{ACK}-1}^{ACK}$ HARQ-ACK information bits, for a total number of $O_{ACK}$ HARQ-ACK information bits, of a HARQ-ACK codebook for transmission in a PUCCH according to the following pseudo-code. The cardinality of the set $M_{A,c}$ defines a total number $M_c$ of occasions for PDSCH reception or SPS PDSCH release for serving cell c corresponding to the HARQ-ACK information bits.

```
                    9.1.3.1 Type-2 HARQ-ACK codebook in physical uplink control channel Set c = 0-serving cell index: lower indexes correspond to lower RRC indexes of corresponding cells
  including, when applicable, cells in the set S_0 and the set S_1
Set j = 0-HARQ-ACK information bit index
Set N_cells^{DL} to the number of serving cells configured by higher layers for the UE
    while c < N_cells^{DL}
        Set m = 0-index of occasion for candidate PDSCH reception or SPS PDSCH release
        while m < M_c
            if harq-ACK-SpatialBundlingPUCCH is not provided, PDSCH-CodeBlockGroupTransmission
              is not provided, and the UE is configured by maxNrofCodeWordsScheduledByDCI with
              reception of two transport blocks for the active DL BWP of serving cell c,
                õ_j^{ACK} = HARQ-ACK information bit corresponding to a first transport block of this cell;
                j = j + 1;
```

| 9.1.3.1 Type-2 HARQ-ACK codebook in physical uplink control channel |
|---|

```
      õ_j^ACK = HARQ-ACK information bit corresponding to a second transport block of this cell;
      j = j + 1;
      . . .
    else
      õ_j^ACK = HARQ-ACK information bit of serving cell c;
      j = j + 1;
    end if
    m = m + 1;
  end while
  c = c + 1;
end while
```

A UE determines monitoring occasions for PDCCH with DCI format scheduling PDSCH receptions or SPS PDSCH release or indicating SCell dormancy on an active DL BWP of a serving cell c, as described in clause 10.1, and for which the UE transmits HARQ-ACK information in a same PUCCH in slot n based on PDSCH-to-HARQ_feedback timing indicator field values for PUCCH transmission with HARQ-ACK information in slot n in response to PDSCH receptions, SPS PDSCH release or SCell dormancy indication slot offsets $K_0$ [6, TS 38.214] provided by time domain resource assignment field in a DCI format scheduling PDSCH receptions.

The set of PDCCH monitoring occasions for a DCI format scheduling PDSCH receptions or SPS PDSCH release or indicating SCell dormancy is defined as the union of PDCCH monitoring occasions across active DL BWPs of configured serving cells. PDCCH monitoring occasions are indexed in an ascending order of their start times. The cardinality of the set of PDCCH monitoring occasions defines a total number M of PDCCH monitoring occasions. A value of the counter downlink assignment indicator (DAI) field in DCI formats denotes the accumulative number of {serving cell, PDCCH monitoring occasion}-pair(s) in which PDCCH reception(s), SPS PDSCH release or SCell dormancy indication associated with the DCI formats is present up to the current serving cell and current PDCCH monitoring occasion, first, if the UE indicates by type2-HARQ-ACK-Codebook support for more than one PDSCH reception on a serving cell that are scheduled from a same PDCCH monitoring occasion, in increasing order of the PDSCH reception starting time for the same {serving cell, PDCCH monitoring occasion} pair, second in ascending order of serving cell index, and third in ascending order of PDCCH monitoring occasion index m, where 0≤m<M.

. . .

Denote by $N_{c\text{-}DAI}^{DL}$ the number of bits for the counter DAI and set $T_D = 2^{N_{C\text{-}DAI}^{DL}}$. Denote by $V_{c\text{-}DAI,c,m}$ the value of the counter DAI in a DCI format scheduling PDSCH reception, SPS PDSCH release or SCell dormancy indication on serving cell c in PDCCH monitoring occasion m according to Table 9.1.3-1 or Table 9.1.3-1A. Denote by $V_{T\text{-}DAI,m}^{DL}$ the value of the total DAI in a DCI format in PDCCH monitoring occasion m according to Table 9.1.3-1. The UE assumes a same value of total DAI in all DCI formats that include a total DAI field in PDCCH monitoring occasion m.

If the UE transmits HARQ-ACK information in a PUCCH in slot n and for any PUCCH format, the UE determines the $\tilde{o}_0^{ACK}, \tilde{o}_1^{ACK}, \ldots, \tilde{o}_{O_{ACK}-1}^{ACK}$, for a total number of $O_{ACK}$ HARQ-ACK information bits, according to the following pseudo-code:

```
Set m = 0 - PDCCH with DCI format scheduling PDSCH reception, SPS PDSCH release or SCell
    dormancy indication monitoring occasion index: lower index corresponds to earlier PDCCH
    monitoring occasion
Set j = 0
Set V_temp = 0
Set V_temp2 = 0
Set V_S = Ø
Set N_cells^DL to the number of serving cells configured by higher layers for the UE
. . .
Set M to the number of PDCCH monitoring occasion(s)
while m < M
  Set c = 0 - serving cell index: lower indexes correspond to lower RRC indexes of corresponding
      cell
  while c < N_cells^DL
      if PDCCH monitoring occasion m is before an active DL BWP change on serving cell c or an
          active UL BWP change on the PCell and an active DL BWP change is not triggered in PDCCH
          monitoring occasion m
        c = c + 1;
      else
        if there is a PDSCH on serving cell c associated with PDCCH in PDCCH monitoring
            occasion m, or there is a PDCCH indicating SPS PDSCH release or SCell dormancy on
            serving cell c
          if V_{C-DAI,c,m}^DL ≤ V_temp
            j = j +1
          end if
          V_temp = V_{C-DAI,c,m}^DL
          if V_{T-DAI,c,m}^DL = Ø
            V_temp,2 = V_{C-DAI,c,m}^DL
```

```
    else
        V_temp,2 = V_{T-DAI,c,m}^{DL}
    end if
    if harq-ACK-SpatialBundlingPUCCH is not provided and the UE is configured by
    maxNrofCodeWordsScheduledByDCI with reception of two transport blocks for at least
    one configured DL BWP of at least one serving cell,
```

$$\tilde{o}^{ACK}_{2 \cdot T_D \cdot j + 2\left(V^{DL}_{C-DAI,c,m}-1\right)} = HARQ - ACK \text{ information}$$

bit corresponding to the first transport block of this cell $$\tilde{o}^{ACK}_{2 \cdot T_D \cdot j + 2\left(V^{DL}_{C-DAI,c,m}-1\right)+1} = HARQ - ACK \text{ information}$$

bit corresponding to the second transport block of this cell $$V_S = V_S \quad \{2 \cdot T_D \cdot j + 2(V_{C-DAI,c,m}^{DL} - 1), 2 \cdot T_D \cdot j + 2(V_{C-DAI,c,m}^{DL} - 1) + 1\}$$

```
            ...
        else
            V_S = V_S {T_D · j + V_{T-DAI,c,m}^{DL} - 1}
        end if
    end if
    c = c + 1
  end if
  end while
  m = m + 1
end while
```

$$V_{temp} = \left(j \bmod\left(\frac{4}{T_D}\right)\right) \times \left(\frac{4}{T_D}\right) + V_{temp}$$

```
if UE does not set V_temp2 = V_{T-DAI,c,m}^{UL} and T_D = 2
    V_temp2 = V_temp
end if
```

$$j = \left\lfloor \frac{j \times T_D}{4} \right\rfloor$$

```
if V_temp2 < V_temp
    j = j + 1
end if
if harq-ACK-SpatialBundlingPUCCH is not provided to the UE and the UE is configured by
maxNrofCodeWordsScheduledByDCI with reception of two transport blocks for at least one
configured DL BWP of a serving cell,
    O^{ACK} = 2 · (4 · j + V_temp2)
else
    O^{ACK} = 4 · j + V_temp2
end if
õ_i^{ACK} = NACK for any i ∈ {0,1,..., O^{ACK} - 1}\V_S
...
```

TABLE 9.1.3-1

Value of counter DAI for $N_{C-DAI}^{DL} = 2$ and of total DAI

| DAI MSB, LSB | $V_{C-DAI}^{DL}$ or $V_{T-DAI}^{DL}$ | Number of {serving cell, PDCCH monitoring occasion}-pair(s) in which PDSCH transmission(s) associated with PDCCH or PDCCH indicating SPS PDSCH release or DCI format 1_1 indicating SCell dormancy is present, denoted as Y and Y ≥ 1 |
|---|---|---|
| 0,0 | 1 | (Y − 1) mod $T_D$ + 1 = 1 |
| 0,1 | 2 | (Y − 1) mod $T_D$ + 1 = 2 |
| 1,0 | 3 | (Y − 1) mod $T_D$ + 1 = 3 |
| 1,1 | 4 | (Y − 1) mod $T_D$ + 1 = 4 |

12 Bandwidth Part Operation

...

For each DL BWP or UL BWP in a set of DL BWPs or UL BWPs, respectively, the UE is provided the following parameters for the serving cell as defined in [4, TS 38.211] or [6, TS 38.214]:

a SCS by subcarrierSpacing a cyclic prefix by cyclicPrefix a common RB $N_{BWP}^{start}=O_{carrier}+RB_{start}$ and a number of contiguous RBs $N_{BWP}^{size}=L_{RB}$ provided by locationAndBandwidth that indicates an offset $RB_{start}$ and a length $L_{RB}$ as RIV according to [6, TS 38.214], setting $N_{BWP}^{size}=275$, and a value $O_{carrier}$ provided by offsetToCarrier for the subcarrierSpacing an index in the set of DL BWPs or UL BWPs by respective BWP-Id a set of BWP-common and a set of BWP-dedicated parameters by BWP-DownlinkCommon and BWP-DownlinkDedicated for the DL BWP, or BWP-UplinkCommon and BWP-UplinkDedicated for the UL BWP [12, TS 38.331]

For unpaired spectrum operation, a DL BWP from the set of configured DL BWPs with index provided by BWP-Id is linked with an UL BWP from the set of configured UL BWPs with index provided by BWP-Id when the DL BWP index and the UL BWP index are same. For unpaired spectrum operation, a UE does not expect to receive a configuration where the center frequency for a DL BWP is different than the center frequency for an UL BWP when the BWP-Id of the DL BWP is same as the BWP-Id of the UL BWP.

In RAN1 #104-e meeting, some alternatives and/or agreements for PUCCH carrier switching in a PUCCH group are discussed, as quoted below from Chairman's Notes RAN1 #104b-e final:
Agreements: For further study on whether and how to support PUCCH carrier switching in a PUCCH group, focus on the following three alternatives:
  Alt. 1: PUCCH carrier switching is based dynamic indication in DCI
  Alt. 2B: PUCCH carrier switching is based on certain (semi-static) rules
  Alt. 2C: PUCCH carrier switching is based on RRC configured PUCCH cell timing pattern of applicable PUCCH cells
In RAN1 #105-e meeting, dynamic and/or semi-static PUCCH carrier switch and Downlink Control Information (DCI) for beam indication without downlink assignment are discussed, as quoted below from Chair's Notes RAN1 #105-e v012:
Agreement: Support PUCCH carrier switching based on dynamic indication in DCI scheduling a PUCCH and semi-static configuration
Agreement: For PUCCH carrier switching, the PUCCH resource configuration is per UL BWP (i.e. per candidate cell and UL BWP of that specific candidate cell).
Agreement: For PUCCH carrier switching based on dynamic indication in DCI scheduling a PUCCH (i.e. Alt. 1), the PDSCH to HARQ-ACK offset k1 is interpreted based on the numerology of the dynamically indicated target PUCCH cell.
Agreement
For beam indication with Rel-17 unified TCI, support DCI format 1_1/1_2 without DL assignment:
  Use ACK/NACK mechanism analogous to that for SPS PDSCH release with both type-1 and type-2 HARQ-ACK codebook:
    Upon a successful reception of the beam indication DCI, the UE reports an ACK
    The ACK is reported in a PUCCH k slots after the end of the PDCCH reception where k is indicated by the PDSCH-to-HARQ_feedback timing indicator field in the DCI format
  When used for beam indication:
    CS-RNTI is used to scramble the CRC for the DCI
    The values of the following DCI fields are set as follows:
      RV=all '1's
      MCS=all '1's
      NDI=0
      Set to all '0's for FDRA Type 0, or all for FDRA Type 1, or all '0's for dynamicSwitch (same as in Table 10.2-4 of TS38.213)

In NR Rel-16, there are at least two types of Hybrid Automatic Repeat request (HARQ) codebooks for HARQ feedback associated with one or more downlink assignments. In some examples, codebook and/or HARQ codebook may also be referred to as HARQ-ACK codebook (e.g., ACK may correspond to Acknowledgment). The at least two types of HARQ codebooks comprise type-1 codebook (e.g., type-1 HARQ codebook) and/or type-2 codebook (e.g., type-2 HARQ codebook). For type-1 codebook and/or type-2 codebook, the one or more downlink assignments may comprise Physical Downlink Shared Channel (PDSCH) reception (comprising reception of a PDSCH scheduled by Downlink Control Information (DCI) and/or reception of a Semi-Persistent Scheduling (SPS) PDSCH, for example) and/or SPS PDSCH release (e.g., a Physical Downlink Control Channel (PDCCH) indicating SPS PDSCH release) and/or a Secondary Cell (SCell) dormancy indication (e.g., a PDCCH with or without a scheduled downlink PDSCH).

Type-1 codebook size (e.g., a size of a type-1 codebook) may be determined based on a set of timing values $K_{1,k}$, a set of row indexes R of a table, a combination of downlink (DL) subcarrier spacing (SCs) and uplink (UL) SCS (e.g., a ratio of DL SCS to UL SCS or a ratio of UL SCS to DL SCS), and/or a Time Division Duplex (TDD) configuration for UL and DL slots (and/or for UL and DL symbols). For type-1 codebook, for a given slot $n_u$ (with UL SCS, for example), a UE may determine a set of slots (e.g., a set of one or more slots) based on one or more timing values in the set of timing values $K_{1,k}$. The set of slots (e.g., slots $n_u-K_{1,k}$) may be associated with UL SCS that is the same SCS as a UL SCS of slot $n_u$. Each slot of the set of slots may comprise one or more DL slots associated with a serving cell, wherein the one or more DL slots (and/or the serving cell) may depend on DL SCS and/or UL SCS. In some examples, for a scenario in which DL SCS is smaller than UL SCS, merely one of a plurality of DL slots is associated with a slot of the set of slots. For a DL slot (e.g., one DL slot), the UE may determine one or more occasions in the DL slot based on the UE's capability of a quantity of PDSCH receptions in a slot (e.g., a maximum quantity of PDSCH receptions that the UE is capable of and/or configured for in a single slot) and/or based on a quantity of non-overlapping Start and Length Indicator Values (SLIVs) according to the set of row indexes R (and/or based on other data in addition to the capability of the quantity of PDSCH receptions in a slot and/or the quantity of non-overlapping SLIVs). In some examples, a DL slot may comprise one or more OFDM symbols associated with uplink or flexible. In some examples, the term "DL slot" may refer to a slot that is with DL SCS and/or a slot comprising one or more OFDM symbols that are with DL SCS. In some examples, the term "UL slot" may refer to a slot that is with UL SCS and/or a slot comprising one or more OFDM symbols that are with UL SCS. In some examples, the slot $n_u$ is an uplink slot. In some examples, each slot of the set of slots (i.e. $n_u-K_{1,k}$) is UL slot.

Type-2 codebook size (e.g., a size of a type-2 codebook) may be determined based on a set of PDCCH monitoring occasions according to at least one timing value from a set of timing values $K_0$ and/or one timing value from a set of timing values $K_{1,k}$. Alternatively and/or additionally, the type-2 codebook size may be determined based on other information (e.g., the other information may be used in addition to the set of PDCCH monitoring occasions for determining the type-2 codebook size). Alternatively and/or additionally, the type-2 codebook size may be determined based on total Downlink Assignment Index (DAI) and/or counter DAI, wherein the total DAI and/or the counter DAI may be indicated by one or more DCIs in the set of PDCCH monitoring occasions. In some examples, type-2 codebook size may be determined based on SPS PDSCH configuration (e.g., the SPS PDSCH configuration may be used in addition to the set of PDCCH monitoring occasions, the total DAI and/or the counter DAI for determining the type-2 codebook size). In some examples, the set of PDCCH monitoring occasions comprises one or more PDCCH monitoring occasions for a DCI format that schedules one or more PDSCH receptions or SPS PDSCH release and/or that indicates SCell dormancy. In some examples, the set of PDCCH monitoring occasions is defined as the union of PDCCH monitoring occasions across active DL bandwidth parts (BWPs) of configured serving cells. In some examples, PDCCH monitoring occasions in the set of PDCCH monitoring occasions may be indexed in an ascending order of their start times.

According to section 9 in 3GPP TS 38.213 V16.5.0, for Dual Connectivity (DC), only Primary Cell (PCell) and/or Primary Secondary Cell (PSCell) may be configured with a Physical Uplink Control Channel (PUCCH) resource. For Carrier Aggregation (CA), a PCell may be configured with a PUCCH resource. For CA, a UE may be configured with two PUCCH groups (while for DC, it may not be ensured that the UE be configured with two PUCCH groups). The UE may be configured with a PUCCH resource on an additional SCell for a first PUCCH group (e.g., one PUCCH group) of the two PUCCH groups. For a second PUCCH group, of the two PUCCH groups, comprising PCell (e.g., the first PUCCH group may not comprise the additional SCell), one or more serving cells associated with the second PUCCH group may be associated with PUCCH resource on the PCell. For the first PUCCH group comprising the additional SCell (e.g., the first PUCCH group may not comprise the PCell), one or more serving cells associated with the first PUCCH group may be associated with PUCCH resource on the additional SCell. In some examples, for type-1 codebook, the UE may perform operations in accordance with pseudo code in section 9.1.2.1 of 3GPP TS 38.213 V16.5.0 (e.g., the UE may perform the operations for one or more serving cells, respectively). In some examples, for type-2 codebook, the UE may perform operations in accordance with pseudo code in section 9.1.3.1 of 3GPP TS 38.213 V16.5.0 (e.g., the UE may perform the operations for one or more serving cells, respectively). In some examples, for both type-1 codebook and type-2 codebook, the UE may perform operations in accordance with pseudo code in sections 9.1.2.1 and 9.1.3.1 of 3GPP TS 38.213 V16.5.0 respectively and for one or more serving cells, respectively. According to section 9 of 3GPP TS 38.213 V16.5.0, "PCell" in pseudo code in sections 9.1.2.1 and 9.1.3.1 may be replaced with the additional SCell configured with PUCCH resource (in case of two PUCCH groups, for example).

According to pseudo code provided in section 9.1.2.1 of 3GPP TS 38.213 V16.5.0, for serving cell c (for one and/or each timing value k from the set of timing values $K_{1,k}$), if Condition A is met [Condition A is met if: (i) slot $n_u$ starts at a same time as or after a slot for an active DL BWP change on the serving cell c or for an active UL BWP change on the PCell; and (ii) slot $\lfloor (n_U)-K_{1,k}) \cdot 2^{\mu_{DL}-\mu_{UL}} \rfloor + n_D$ is before the slot for the active DL BWP change on serving cell C or the active UL BWP change on the PCell], then $n_D=n_D+1$, DL slot $n_D$ is skipped when determining a codebook (e.g., a type-1 codebook) and/or one or more occasions in the DL slot $n_D$ are not included and/or counted in the codebook (e.g., the type-1 codebook).

According to pseudo code provided in section 9.1.3.1 of 3GPP TS 38.213 V16.5.0, for a given PDCCH monitoring occasion m associated with a given serving cell c (e.g., the PDCCH monitoring occasion m may be on the serving cell c), if Condition B is met [Condition B is met if: (i) PDCCH monitoring occasion m is before an active DL BWP change on serving cell c, and/or (ii) an active UL BWP change on the PCell and an active DL BWP change is not triggered in PDCCH monitoring occasion m], then c=c+1, the given serving cell c is skipped when determining a codebook (e.g., a type-2 codebook), and/or the PDCCH monitoring occasion m associated with the given serving cell c is not included or counted in the codebook (e.g., the type-2 codebook).

In some examples, an outcome of the pseudo code in section 9.1.2.1 and/or the pseudo code in section 9.1.3.1 may be that there is no location for HARQ (e.g., HARQ information) in response to one or more occasions (for type-1 codebook, for example) before an active BWP change (e.g., DL and/or UL BWP change) and/or in response to one or more PDCCH monitoring occasions (for type-2 codebook, for example) before an active BWP change (e.g., DL and/or UL BWP change).

In some examples, a serving cell may be associated with (e.g., configured with) Frequency Division Duplex (FDD) or Time Division Duplex (TDD). Alternatively and/or additionally, the serving cell may be associated with (e.g., configured with) paired spectrum or unpaired spectrum. In some examples, for unpaired spectrum, a DL BWP is paired to one UL BWP, and once DL BWP change happens, the paired UL BWP also changes.

In NR Rel-17, PUCCH carrier switch is introduced and discussed. Implementation of PUCCH carrier switch may provide latency reduction and/or PUCCH overhead offloading. Since UL of a TDD DL-UL configuration for a first serving cell (e.g., one serving cell) may be interlaced with UL of TDD DL-UL configuration for a second serving cell (different than the first serving cell), PUCCH resources from the two serving cells (e.g., the first serving cell and the second serving cell) may increase a density of PUCCH resources in time domain. In some examples, a UE may be configured with (and/or indicated) a SCell (and/or the SCell may be indicated to the UE). For example, the UE may be configured with the SCell with one or more PUCCH resources in addition to a PCell in one PUCCH group. One assumption may be that one slot (e.g., a slot with a lowest SCS) is associated with one carrier configured with one or more PUCCH resources. In some examples, for simplicity, one slot may be associated with only one carrier with one or more PUCCH resources. In this way, for the UE, it may be clear which carrier's PUCCH resource to use in a slot. Alternatively and/or additionally, the UE may determine a carrier configured with a PUCCH resource (in addition to PCell, for example) in a given slot based on serving cell index (and/or based on other information in addition to the serving cell index).

In some examples, a DCI may be indicative of using a carrier/cell configured with PUCCH resource (e.g., the information of the DCI may indicate which carrier/cell, configured with PUCCH resource, to use). In the present disclosure, the term "carrier/cell" may correspond to a carrier and/or a cell. In some examples, a DCI may comprise a field indicative of using a carrier/cell, configured with PUCCH resource, for transmitting PUCCH (e.g., PUCCH comprising HARQ information in response to scheduling of the DCI).

In some examples, a UE may be configured with a pattern for indicating an association between one or more slots and one or more serving cells with PUCCH resources. In some examples, the pattern is used for indicating, to the UE, which serving cell's PUCCH resource to use in a slot. For example, the UE may determine, based on the pattern, to use one or more PUCCH resources of a first serving cell (and not to use one or more PUCCH resources of a second serving cell, for example).

With introduction (and/or implementation) of PUCCH carrier switch, legacy behavior for determining HARQ codebook considering an active BWP change (e.g., DL and/or UL BWP change) may not be reasonable and/or may not be efficient since HARQ information associated with at least some occasions and/or at least some PDCCH monitoring occasions are not included in the HARQ codebook. Without the HARQ information, a network may be required to perform additional DL transmissions (since the network is not informed of whether or not previously sent DL transmissions are successfully received by a receiver, for example). Thus, in accordance with one or more of the techniques herein, HARQ codebook generation is enhanced in an efficient way.

A concept of the present disclosure is that a UE determines whether or not to include at least one location, associated with one or more occasions, in a HARQ codebook based on whether or not the cell for transmitting the HARQ codebook has active UL BWP change (and/or based on other data in addition to whether or not the cell has active UL BWP change). In an example in which the one or more occasions are associated with a HARQ codebook, information (e.g., one or more locations) associated with the one or more occasions may be included in the HARQ codebook.

A concept of the present disclosure is that a UE determines whether or not to include at least one location, associated with one or more occasions, in a HARQ codebook based on which cell, of a first cell and a second cell, is used for transmitting the HARQ codebook (and/or based on other data in addition to the cell, of the first cell and the second cell, is used for transmitting the HARQ codebook). In other words, the UE may determine whether or not the HARQ codebook comprises at least one location associated with the one or more occasions based on the cell, of the first cell and the second cell, that is used for transmitting the HARQ codebook (and/or based on other data in addition to the cell, of the first cell and the second cell, is used for transmitting the HARQ codebook). Alternatively and/or additionally, the UE may determine whether or not a HARQ codebook comprises HARQ information (that is in response to the one or more occasions) based on the cell, of the first cell and the second cell, that is used for transmitting the HARQ codebook (and/or based on other data in addition to the cell, of the first cell and the second cell, that is used for transmitting the HARQ codebook).

In some examples, the one or more occasions are associated with type-1 codebook or are associated with type-2 codebook. In an example in which the one or more occasions are associated with type-1 codebook, information (e.g., one or more locations) associated with the one or more occasions may be included in a HARQ codebook that is a type-1 codebook. In an example in which the one or more occasions are associated with type-2 codebook, information (e.g., one or more locations) associated with the one or more occasions may be included in a HARQ codebook that is a type-2 codebook. In the example in which the one or more occasions are associated with type-2 codebook, the one or more occasions may be one or more PDCCH monitoring occasions.

In some examples, the one or more occasions are before an active UL BWP change on the first cell.

In some examples, the UE is configured with one or more PUCCH resources on the first cell and the second cell in a PUCCH group. In some examples, the PUCCH group may comprise one or more cells in addition to the first cell and the second cell. In some examples, the one or more occasions are associated with a slot for transmitting the HARQ codebook, wherein the HARQ codebook is transmitted in the first cell or the second cell.

In some examples, if Condition C is met [Condition C is met if: (i) the UE transmits the HARQ codebook on the first cell (that is with an active UL BWP change, for example); (ii) the UE is scheduled to transmit the HARQ codebook on the first cell (that is with an active UL BWP change, for example); and/or (iii) the UE is configured to transmit the HARQ codebook on the first cell (that is with an active UL BWP change, for example)], the UE may determine not to include a location (e.g., any location), associated with the one or more occasions, in the HARQ codebook (e.g., the UE may determine not to include a location associated with the one or more occasions in the HARQ codebook based on a determination that Condition C is met). Alternatively and/or additionally, if Condition C is met, the UE may determine not to include locations (e.g., any location), that are associated with the one or more occasions and are for cells (e.g., all cells) in the PUCCH group, in the HARQ codebook.

In some examples, if Condition D is met [Condition D is met if: (i) the UE transmits the HARQ codebook on the second cell (that is not with an active UL BWP change, for example); (ii) the UE is scheduled to transmit the HARQ codebook on the second cell (that is not with an active UL BWP change, for example); and/or (iii) the UE is configured to transmit the HARQ codebook on the second cell (that is not with active UL BWP change, for example)], the UE may determine to include at least one location, associated with the one or more occasions, in the HARQ codebook (e.g., the UE may determine to include the at least one location associated with the one or more occasions in the HARQ codebook based on a determination that Condition D is met). Alternatively and/or additionally, if Condition D is met, the UE may determine to include locations, that are associated with the one or more occasions and are for cells in the PUCCH group, in the HARQ codebook. Alternatively and/or additionally, if Condition D is met, the UE may determine not to include locations (e.g., any location), in the HARQ codebook, that are associated with the one or more occasions and are for the first cell, and the UE may determine to include locations, in the HARQ codebook, that are associated with the one or more occasions and are for cells, different than the first cell, in the PUCCH group (e.g., the cells may comprise some cells of the PUCCH group, such as all cells of the PUCCH group except for the first cell).

In some examples, HARQ information (e.g., one or more HARQ information bits corresponding to the at least one location associated with the one or more occasions) that is in response to the one or more occasions may be included in the HARQ codebook. For example, the HARQ information may be included in the HARQ codebook in response to the determination to include the at least one location, associated with the one or more occasions, in the HARQ codebook (e.g., the determination may be made in response to a determination that Condition D is met).

In some examples, HARQ information (e.g., one or more HARQ information bits corresponding to the at least one location associated with the one or more occasions) that is in response to the one or more occasions may be included in the at least one location associated with the one or more occasions in the HARQ codebook. For example, the HARQ information may be included in the at least one location in response to the determination to include the at least one location, associated with the one or more occasions, in the HARQ codebook (e.g., the determination may be made in response to a determination that Condition D is met).

In some examples, there is no location for placing HARQ information (e.g., corresponding HARQ information) that is in response to the one or more occasions in the HARQ codebook. For example, there may be no location for placing the HARQ information in response to the determination to not include a location, associated with the one or more occasions, in the HARQ codebook (e.g., the determination may be made in response to a determination that Condition C is met).

In some examples, the one or more occasions may comprise one or more subsets. In some examples, each subset of the one or more subsets corresponds to a subset of occasions of the one or more occasions. In some examples, the one or more subsets may have overlapped occasions (such as where one subset of the one or more subsets comprises an occasion that is also included in another subset of the one or more subsets). In some examples, the one or more subsets may not have overlapped occasions. In some examples, each subset of the one or more subsets is associated with a cell in the PUCCH group. For example, for each cell of some and/or all cells of the PUCCH group, the one or more subsets may comprise a subset that is associated with the cell.

For example, the one or more subsets may comprise a first subset of the one or more occasions associated with the first cell, a second subset of the one or more occasions associated with the second cell, a third subset of the one or more occasions associated with a third cell (e.g., a third cell of the PUCCH group), and/or one or more other subsets of the one or more occasions associated with one or more other cells (e.g., one or more other cells of the PUCCH group).

In some examples, the first subset of the one or more occasions is in the first cell.

In some examples, the second subset of the one or more occasions is in the second cell.

In some examples, the third subset of the one or more occasions is in the third cell.

In some examples, the first subset of the one or more occasions may be (and/or may be replaced by and/or may correspond to) a first set of occasions associated with the first cell.

In some examples, the second subset of the one or more occasions may be (and/or may be replaced by and/or may correspond to) a second set of occasions associated with the second cell.

In some examples, the third subset of the one or more occasions may be (and/or may be replaced by and/or may correspond to) a third set of occasions associated with the third cell.

In some examples, the first subset of the one or more occasions may be determined (e.g., derived) based on a first set of slots.

In some examples, the second subset of the one or more occasions may be determined (e.g., derived) based on a second set of slots.

In some examples, the third subset of the one or more occasions may be determined (e.g., derived) based on a third set of slots.

In some examples, the first set of slots are determined (e.g., derived) based on a first set of timing values (e.g., a set of timing values $K_{1,k}$).

In some examples, the second set of slots are determined (e.g., derived) based on a second set of timing values (e.g., a set of timing values $K_{1,k}$).

In some examples, the third set of slots are determined (e.g., derived) based on a third set of timing values (e.g., a set of timing values $K_{1,k}$).

In some examples, one or more timing values in a set of timing values (e.g., the first set of timing values, the second set of timing values, and/or the second set of timing values) indicate a slot offset from a slot of a DL data (e.g., a slot of reception of the DL data) to a slot of UL HARQ corresponding to the DL data (e.g., a slot in which the UL HARQ corresponding to the DL data is to be transmitted).

In some examples, the first set of timing values, the second set of timing values, and/or the third set of timing values are the same as each other. Alternatively and/or additionally, the first set of timing values, the second set of timing values and/or the third set of timing values may be different sets of timing values.

In some examples, one or more timing values in the set of timing values is associated with SCS and/or numerology of a cell, that is the first cell or the second cell, for transmitting the HARQ codebook.

In some examples, the third cell may be a cell, in the PUCCH group, that is not the first cell and is not the second cell. In some examples, the UE is not configured with PUCCH resource on the third cell.

In some examples, in response to the determination to include at least one location, associated with the one or more occasions, in the HARQ codebook, the UE may not include one or more locations, associated with the first subset of the one or more occasions, in the HARQ codebook.

In some examples, in response to the determination to include at least one location, associated with the one or more occasions, in the HARQ codebook, if the UE transmits the HARQ codebook on the first cell, the UE may not include one or more locations, associated with the first subset of the one or more occasions, in the HARQ codebook.

In some examples, in response to the determination to include at least one location, associated with the one or more occasions, in the HARQ codebook, if the UE transmits the HARQ codebook on the second cell (which is the cell without an active UL BWP change, for example), the UE may not include one or more locations, associated with the first subset of the one or more occasions, in the HARQ codebook.

In some examples, for the first cell, the UE does not include one or more locations, associated with the first subset of the one or more occasions, in the HARQ codebook.

In some examples, once the UE changes active UL BWP (on the first cell, for example), the UE also changes active DL BWP (on the first cell, for example), such as due, at least in part, to the first cell being configured with unpaired spectrum.

In some examples, once the UE changes active DL BWP (on the first cell, for example), the UE also changes active UL BWP (on the first cell, for example), such as due, at least in part, to the first cell being configured with unpaired spectrum.

In some examples, for the second cell, the UE may include one or more locations, associated with the second subset of the one or more occasions, in the HARQ codebook.

In some examples, in response to the determination to include at least one location, associated with the one or more occasions, in the HARQ codebook, if the UE transmits the HARQ codebook on the second cell, the UE may include one or more locations, associated with the second subset of the one or more occasions (e.g., the UE may include the one or more locations, associated with the second subset of the one or more occasions, in the HARQ codebook if the second cell is configured with unpaired spectrum and an active DL BWP of the second cell is not changed).

In some examples, in response to the determination to include at least one location, associated with the one or more occasions, in the HARQ codebook, if the UE transmits the HARQ codebook on the first cell, the UE may not include one or more locations, associated with the second subset of the one or more occasions, in the HARQ codebook.

In some examples, in response to the determination to include at least one location, associated with the one or more occasions, in the HARQ codebook, the UE may not include one or more locations, associated with the second subset of the one or more occasions, in the HARQ codebook (e.g., the UE may not include the one or more locations, associated with the second subset of the one or more occasions, in the HARQ codebook if the second cell is configured with unpaired spectrum and an active DL BWP of the second cell is changed).

In some examples, for the third cell, the UE may include one or more locations, associated with the third subset of the one or more occasions, in the HARQ codebook.

In some examples, in response to the determination to include at least one location, associated with the one or more occasions, in the HARQ codebook, the UE may not include one or more locations, associated with the third subset of the one or more occasions in the HARQ codebook (e.g., the UE may not include the one or more locations, associated with the third subset of the one or more occasions, in the HARQ codebook if the third cell is configured with unpaired spectrum and an active DL BWP of the third cell is changed).

In some examples, the UE may transmit the HARQ codebook via a PUCCH resource or a Physical Uplink Shared Channel (PUSCH) resource.

In some examples, the UE may transmit the HARQ codebook in a slot (e.g., slot n or slot $n_u$) that is associated with the first cell or the second cell. In some examples, numerology or SCS of the slot (e.g., the slot n or the slot $n_u$) is associated with the first cell or the second cell.

In some examples, the UE may transmit the HARQ codebook in a slot (e.g., slot n or slot $n_u$) in the second cell, wherein the slot (e.g., the slot n or the slot $n_u$) may be before an active UL BWP change of the first cell.

In some examples, in a scenario in which the UE changes an active UL BWP of PCell (e.g., the first cell), the UE may transmit the HARQ codebook in a slot (e.g., slot $n_u$) in the second cell that is a cell with PUCCH resource in a same PUCCH group as the first cell, wherein the slot (e.g., the slot $n_u$) is before the active UL BWP change of the first cell.

In some examples, the UE determines a set of location indexes (e.g., $V_s$) based on a set of PDCCH monitoring occasions.

In some examples, the UE determines a size of the HARQ codebook based on a number of groups (e.g., j) (and/or based on data in addition to the number of groups).

In some examples, the UE determines the size of the HARQ codebook based on at least a second temp value (e.g., $V_{temp2}$).

In some examples, the HARQ codebook may comprise a plurality of locations.

In some examples, if a location index, associated with a PDCCH monitoring occasion (e.g., one PDCCH monitoring occasion), is not in the set of location indexes, the UE does not set (e.g., place) HARQ information, that is in response to the PDCCH monitoring occasion, on a location associated with the location index. For example, the HARQ codebook may not comprise HARQ information that is in response to the PDCCH monitoring occasion, such as due, at least in part, to the set of location indexes not comprising a location index associated with the PDCCH monitoring occasion.

In some examples, the set of PDCCH monitoring occasions are associated with the slot for transmitting the HARQ codebook (e.g., the slot used for transmitting the HARQ codebook), wherein the HARQ codebook is transmitted in the first cell or transmitted in the second cell.

In some examples, the set of PDCCH monitoring occasions are the union of PDCCH monitoring occasions across one or more active DL BWPs of one or more cells in a same PUCCH group.

In some examples, the one or more cells comprises the first cell (and/or one or more other cells in addition to the first cell).

In some examples, the one or more cells comprises the second cell (and/or one or more other cells in addition to the second cell).

In some examples, the UE detects DCI in the set of PDCCH monitoring occasions, wherein the DCI indicates information indicating the slot for transmitting the HARQ codebook.

In some examples, for DCI in one PDCCH monitoring occasion (on one cell) of the set of PDCCH monitoring occasions, the UE may set (e.g., update) a first temp value based on counter DAI indicated by the received DCI (and/or based on other data in addition to the counter DAI indicated by the received DCI). The received DCI may correspond to the DCI in the one PDCCH monitoring occasion (e.g., the DCI may be detected and/or received in the one PDCCH monitoring occasion).

In some examples, for DCI in one PDCCH monitoring occasion (on one cell) of the set of PDCCH monitoring occasions, the UE may set (e.g., update) a second temp value based on a DAI indicated by the received DCI (and/or based on other data in addition to the DAI), wherein the DAI is a counter DAI indicated by the received DCI or a total DAI indicated by the received DCI. The received DCI may correspond to the DCI in the one PDCCH monitoring occasion (e.g., the DCI may be detected and/or received in the one PDCCH monitoring occasion).

In some examples, for DCI in one PDCCH monitoring occasion (on one cell) of the set of PDCCH monitoring occasions, the UE may set (e.g., update) the number of groups (e.g., j) based on whether or not a counter DAI indicated by the received DCI is larger than or equal to the first temp value (e.g., based on whether or not the counter DAI indicated by the received DCI is larger than or equal to a previous value of the first temp value, such as a value of the first temp value prior to the first temp value being updated based on the counter DAI). The received DCI may correspond to the DCI in the one PDCCH monitoring occasion (e.g., the DCI may be detected and/or received in the one PDCCH monitoring occasion). In some examples, if the counter DAI indicated by the received DCI is larger than or equal to the previous value of the first temp value, the UE may set (e.g., update) the number of groups by increasing the number of groups by one.

In some examples, after setting (e.g., updating) the temp value based on the DCI in the PDCCH monitoring occasion (e.g., a last PDCCH monitoring occasion on one cell, such as a cell with a largest cell index among cell indexes of cells of a PUCCH group) of the set of PDCCH monitoring occasions, the UE may set (e.g., update) the number of groups (e.g., j) based on whether or not the first temp value is larger than the second temp value. In some examples, if the first temp value is larger than the second temp value, the UE may set (e.g., update) the number of groups by increasing the number of groups by one.

In some examples, for one PDCCH monitoring occasion (on one cell) of the set of PDCCH monitoring occasions, the UE determines whether or not the set of location indexes comprises a location index associated with the one PDCCH monitoring occasion based on a cell, that is the first cell or the second cell, that is used for transmitting the HARQ codebook. In some examples, if the HARQ codebook is transmitted in the second cell (that is without an active UL BWP change), the UE may include the location index, associated with the one PDCCH monitoring occasion, in the set of location indexes.

In some examples, for one PDCCH monitoring occasion (on one cell) of the set of PDCCH monitoring occasions, the UE determines whether or not the set of location indexes comprises a location index associated with the one PDCCH monitoring occasion based on whether or not an active UL BWP changes on a cell that is used for transmitting the HARQ codebook. In some examples, if the cell on which the HARQ codebook is transmitted is without an active UL BWP change, the UE may include the location index, associated with the one PDCCH monitoring occasion, in the set of location indexes.

In some examples, for one PDCCH monitoring occasion (on one cell) of the set of PDCCH monitoring occasions, the UE determines whether or not the set of location indexes comprises a location index associated with the one PDCCH monitoring occasion based on whether or not an active UL BWP changes on a cell that is used for transmitting the HARQ codebook. In some examples, if the cell on which the HARQ codebook is transmitted is with an active UL BWP change, the UE may not include the location index, associated with the one PDCCH monitoring occasion, in the set of location indexes.

In some examples, for one PDCCH monitoring occasion (on one cell) of the set of PDCCH monitoring occasions, the UE determines whether or not the set of location indexes comprises a location index associated with the one PDCCH monitoring occasion based on whether or not an active DL BWP changes on the one cell. In some examples, if no active DL BWP changes on the one cell (e.g., if there is no active DL BWP change on the one cell after the one PDCCH monitoring occasion, such as no active DL BWP change that is after the PDCCH monitoring occasion and before the slot for transmitting the HARQ codebook for the one PDCCH monitoring occasion), the UE may include the location index, associated with the one PDCCH monitoring occasion, in the set of location indexes.

In some examples, for one PDCCH monitoring occasion (on one cell) of the set of PDCCH monitoring occasions, the UE determines whether or not the set of location indexes comprises a location index associated with the one PDCCH monitoring occasion based on whether or not an active DL BWP changes on the one cell. In some examples, if an active DL BWP changes on the one cell (e.g., if there is an active DL BWP change on the one cell after the one PDCCH monitoring occasion, such as an active DL BWP change that occurs after the PDCCH monitoring occasion and before the slot for transmitting the HARQ codebook for the one PDCCH monitoring occasion), the UE does not include the location index, associated with the one PDCCH monitoring occasion, in the set of location indexes.

In some examples, the one or more PDCCH monitoring occasions are for PDCCH with a DCI format (and/or a DCI having the DCI format) that (i) schedules PDSCH receptions or SPS PDSCH release; and/or (ii) indicates SCell dormancy or beam indication. For example, PDCCH with the DCI format (e.g., a PDCCH signal comprising the DCI having the DCI format) may be received via a PDCCH monitoring occasion of the one or more PDCCH monitoring occasions.

In some examples, the one or more PDCCH monitoring occasions are PDCCH monitoring occasions for which the UE transmits HARQ information in a same PUCCH in slot n.

In some examples, the one or more PDCCH monitoring occasions are associated with slot n.

In some examples, HARQ information, that is in response to the one or more PDCCH monitoring occasions, may be associated with the first cell or the second cell.

In some examples, HARQ information, that is in response to the one or more PDCCH monitoring occasions, may be included in the HARQ codebook if the HARQ codebook is transmitted on the second cell.

In some examples, HARQ information, that is in response to the one or more PDCCH monitoring occasions, may not be included in the HARQ codebook if the HARQ codebook is transmitted on the first cell.

In some examples, the one or more PDCCH monitoring occasions are PDCCH monitoring occasions for which the UE transmits HARQ information in a same PUCCH in slot n based on one timing value from the set of timing value $K_0$ and one timing value from the set of timing value $K_{1,k}$.

In some examples, if the one or more PDCCH monitoring occasions are associated with the first cell (that is with an active UL BWP change), the UE does not include a location, associated with the one or more PDCCH monitoring occasions, in the HARQ codebook.

In some examples, if the one or more PDCCH monitoring occasions is associated with the second cell (that is without an active UL BWP change), the UE may include a location, associated with the one or more PDCCH monitoring occasions, in the HARQ codebook.

Figure 5:
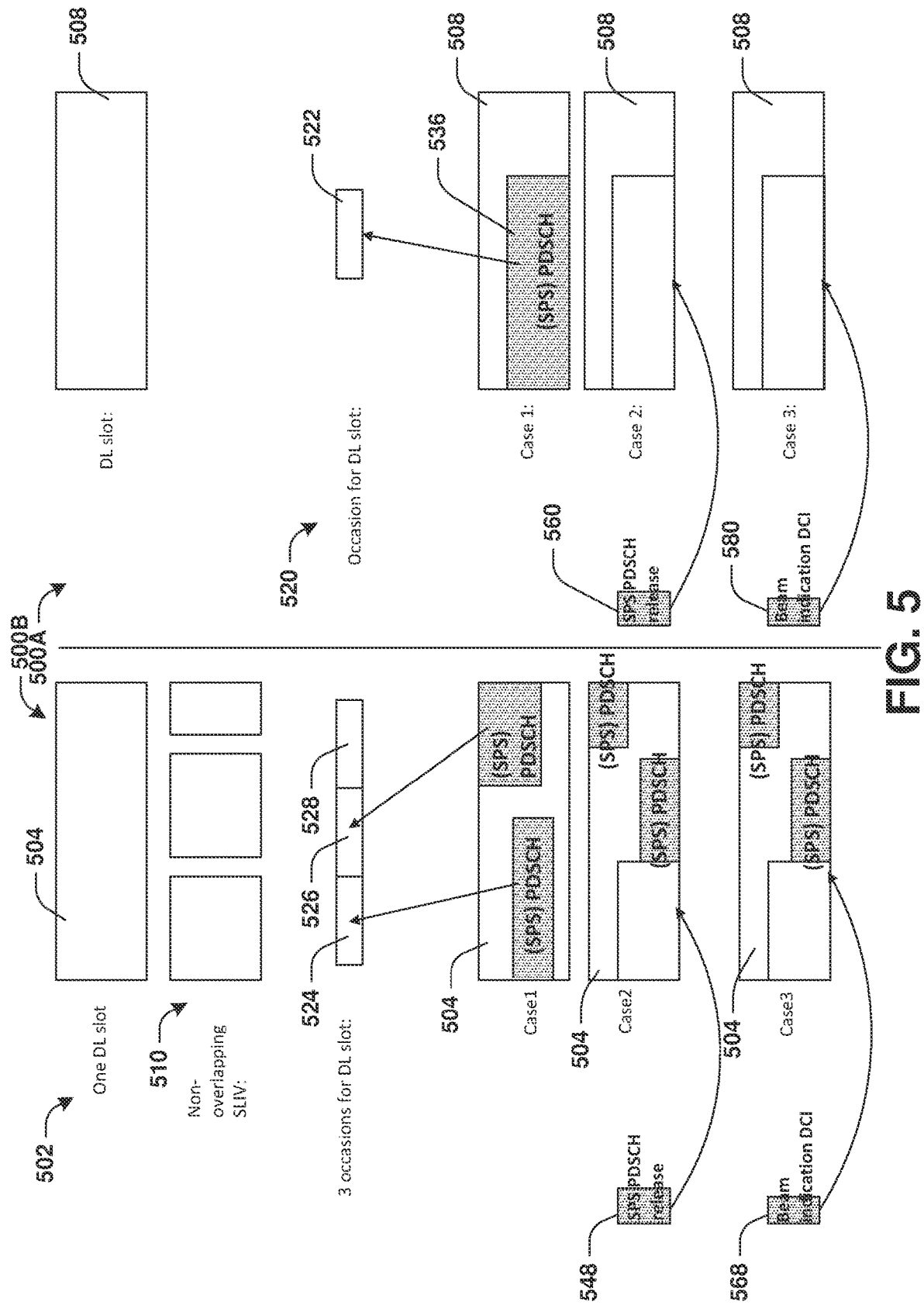
FIG. 5 is a diagram illustrating an exemplary scenario associated with a UE according to one exemplary embodiment.

FIG. 5 illustrates a scenario 500A (on a right side of FIG. 5) and a scenario 500B (on a left side of FIG. 5) associated with the UE. In some examples, in the first scenario 500A, the UE does not have the capability to receive more than one PDSCH in one slot. For example, for one DL slot (e.g., $n_D$), at most one occasion may be considered. An occasion 522 (e.g., the one occasion) may be on a DL slot 508 (e.g., the one DL slot). In some examples, the UE may receive at most one PDSCH in the DL slot 508 (e.g., the one DL slot). A location (e.g., one location) in the HARQ codebook may be associated with the occasion 522 and/or associated with the DL slot 508. The location may comprise HARQ information that is in response to PDSCH reception 536 (e.g., SPS PDSCH reception) in the DL slot 508, such as shown with respect to Case 1 of the first scenario 500A. Alternatively and/or additionally, the location may comprise HARQ information that is in response to SPS PDSCH release 560, such as shown with respect to Case 2 of the first scenario 500A. Alternatively and/or additionally, the location may comprise HARQ information that is in response to a beam indication DCI 580 (e.g., a beam indication DCI that does not schedule PDSCH), such as shown with respect to Case 3 of the first scenario 500A.

In some examples, in the second scenario 500B, the UE may have the capability to receive more than one PDSCH, such as three PDSCHs, in one slot. For example, for one DL slot (e.g., $n_D$), at most three occasions may be considered. A plurality of occasions (e.g., three occasions comprising an occasion 524, an occasion 526 and/or an occasion 528) may be on a DL slot 504 (e.g., the one DL slot). In some examples, the UE may receive at most three PDSCHs in the DL slot 508 (e.g., the one DL slot), such as where the three PDSCHs are separated in time domain in the DL slot 504. A plurality of locations (e.g., three locations) in the HARQ codebook may be associated with the plurality of occasions (e.g., the three occasions). An earlier occasion of the plurality of occasions may be associated with (e.g., may refer to) an earlier location of the plurality of locations (e.g., the plurality of locations may be arranged based on timings of the plurality of occasions, where an initial occasion of the plurality of occasions may be associated with an initial location of the plurality of locations, and/or a last occasion of the plurality of occasions may be associated with a last location of the plurality of locations).

In some examples, if the UE only receives two PDSCHs (e.g., SPS PDSCHs) in the DL slot 504, such as two PDSCHs shown in Case 1 of the second scenario 500B, two locations (e.g., two beginning locations comprising a first location and a second location) of the plurality of locations (e.g., the three locations) may be associated with the received two PDSCHs (e.g., SPS PDSCHs). The UE may generate NACK (Negative Acknowledgment) on a third location of the plurality of locations (e.g., the third location is after the two locations).

Alternatively and/or additionally, the third location may comprise HARQ information in response to a PDSCH reception (e.g., SPS PDSCH reception) in the DL slot 504. Alternatively and/or additionally, the third location may comprise HARQ information in response to a SPS PDSCH release 548, such as the SPS PDSCH release 548 shown in Case 2 of the second scenario 500B. Alternatively and/or additionally, the third location may comprise HARQ information in response to a beam indication DCI 568 (e.g., a beam indication DCI that does not schedule PDSCH), such as the beam indication DCI 568 shown in Case 3 of the second scenario 500B.

In some examples, HARQ information associated with (e.g., in response to) a PDSCH (e.g., a SPS PDSCH) is associated with a location, in the HARQ codebook, and the location is associated with a SLIV (e.g., a SLIV of one or more non-overlapping SLIVs 510) associated with reception of the PDSCH (e.g., SPS PDSCH).

In some examples, HARQ information associated with (e.g., in response to) SPS PDSCH release (e.g., the SPS PDSCH release 548) is associated with a location, in the HARQ codebook, and the location is associated with a SLIV (e.g., a SLIV of the one or more non-overlapping SLIVs 510) associated with an activation DCI for SPS (e.g., a previous activation DCI, such as a previously received activation DCI).

In some examples, HARQ information associated with beam indication DCI (e.g., the beam indication DCI 568) is associated with a location, in the HARQ codebook, and the location is associated with a SLIV (e.g., a SLIV of the one or more non-overlapping SLIVs 510) in the beam indication DCI.

In some examples, a SLIV (e.g., one SLIV, such as one SLIV of the one or more non-overlapping SLIVs 510) may provide information indicative of a starting OFDM symbol and/or a length of a time domain assignment for downlink assignment.

Figure 6:
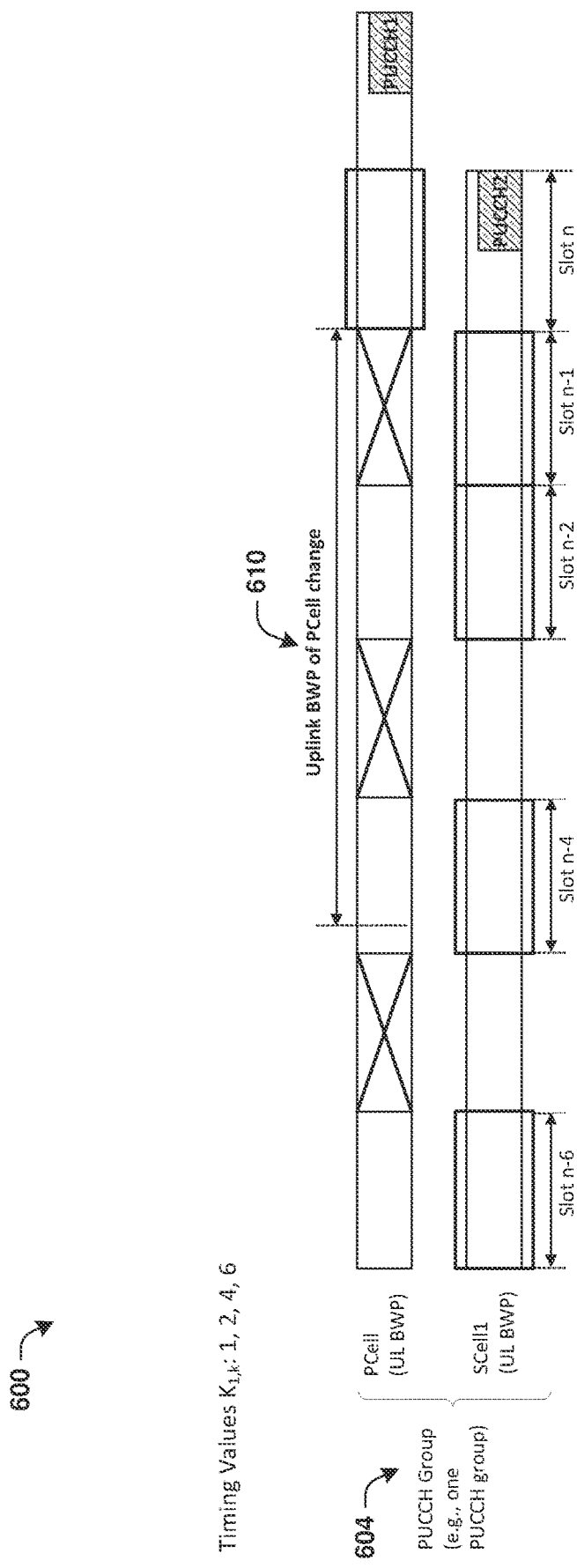
FIG. 6 is a diagram illustrating an exemplary scenario associated with a UE according to one exemplary embodiment.

FIG. 6 illustrates a scenario 600 associated with a UE. The UE may be configured with a set of timing values $K_{1,k}$. The set of timing values $K_{1,k}$ may be a set of timing offsets. In the scenario 600, the set of timing values $K_{1,k}$ may comprise $\{1, 2, 4, 6\}$. The UE may be configured with two cells. For example, the UE may be configured with UL BWPs of the two cells. FIG. 6 shows a timing diagram of activity associated with the UL BWPs of the two cells. In some examples, the two cells and/or the UL BWPs of the two cells are with one or more PUCCH resources. In some examples, the two cells and/or the one or more PUCCH resources are in a same PUCCH group, such as a PUCCH group 604 (e.g., one PUCCH group, wherein the PUCCH group 604 may comprise one or more other cells in addition to the two cells and/or one or more other UL BWPs in addition to the UL BWPs of the two cells). As shown in FIG. 6, the two cells may comprise PCell and SCell1. In some examples, the UE may change an active UL BWP of the PCell. The UE is scheduled to transmit PUCCH2, on slot n, in the SCell1. Based on SCS of SCell1 and the set of timing values $K_{1,k}$ (and/or based on data in addition to the SCS of SCell1 and the set of timing values $K_{1,k}$), PUCCH2 may comprise HARQ information in response to one or more occasions associated with slots $\{n-1, n-2, n-4, n-6\}$. In the example shown in FIG. 6, even though PCell has an active UL BWP change 610, the UE may transmit PUCCH2 comprising HARQ information that is in response to one or more occasions before slot n (wherein the one or more occasions are in one or more slots, such as slots $\{n-1, n-2, n-4\}$, in which the PCell is performing and/or finishing the active UL BWP change 610, for example). In the example shown in FIG. 6, since PCell has the active UL BWP change 610, PUCCH2 does not comprise HARQ information in response to one or more occasions (associated with PCell, for example) associated with slots $\{n-1, n-2, n-4, n-6\}$ of PCell. In some examples, since PCell has the active UL BWP change 610, PUCCH1 (e.g., in slot n+1) does not comprise HARQ information in response to one or more occasions (associated with PCell, for example) associated with slots $\{(n+1)-2, (n+1)-4, (n+1)-6\}$ of PCell.

Figure 7:
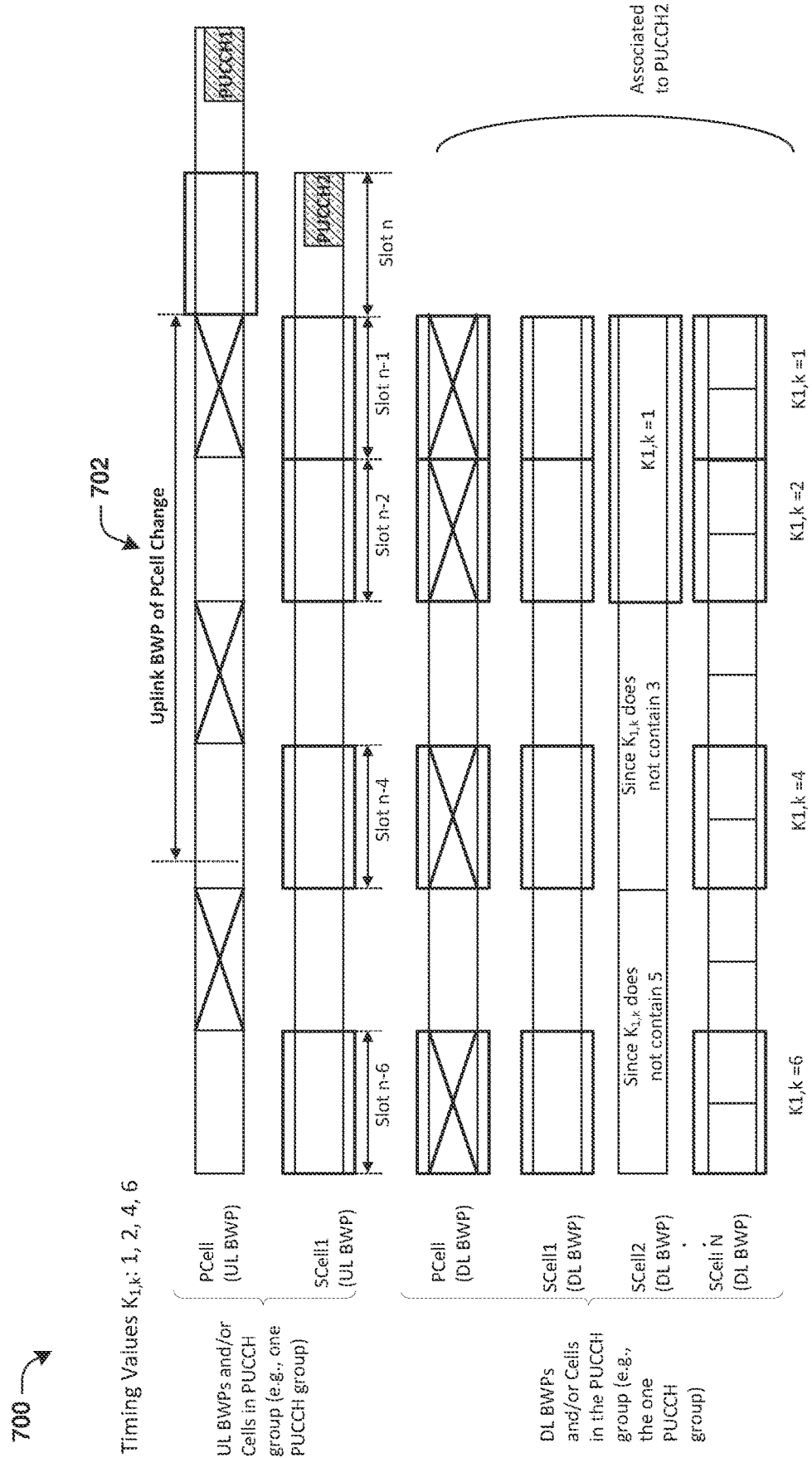
FIG. 7 is a diagram illustrating an exemplary scenario associated with a UE according to one exemplary embodiment.

FIG. 7 illustrates a scenario 700 associated with the UE. The UE may be configured with a set of timing values $K_{1,k}$ (e.g., a set of timing offsets), such as $\{1, 2, 4, 6\}$. A PUCCH group (e.g., one PUCCH group) may comprise PCell and/or SCells (e.g., SCell1, SCell2, ..., SCell N). In the scenario 700, since an active DL BWP of the PCell also changes (in addition to an active UL BWP change 702 of the PCell, for example), for the PCell, the UE may not include one or more locations for a first subset of one or more occasions associated with slots $\{n-1, n-2, n-4, n-6\}$ (e.g., the UE may not include the one or more locations for the first subset of one or more occasions in a HARQ codebook, such as a HARQ codebook transmitted in PUCCH2 in slot n). For SCell1, the UE may include one or more locations for a second subset of one or more occasions associated with slots $\{n-1, n-2, n-4, n-6\}$ (e.g., the UE may include the one or more locations associated with the second subset of one or more occasions in the HARQ codebook). For SCell2 which is with a SCS of DL BWP that is smaller than SCS of UL BWP of SCell1, the UE may include one or more locations for a third subset of one or more occasions associated with slots $\{n-1, n-2, n-4, n-6\}$ (e.g., the UE may include the one or more locations associated with the third subset of one or more occasions in the HARQ codebook). In some examples, the third subset of one or more occasions only comprises one or more occasions associated with $K_{1,k}=1$. Since DL slot of SCell2 in the scenario 700 may be associated with a slot of SCell1 with same ending boundary, timing offsets associated with DL slots of SCell2 may correspond to $\{1, 3, 5\}$, and only $K_{1,k}=1$ is configured (e.g., the set of timing values $K_{1,k}$ does not comprise a timing offset of 3 or a timing offset of 5). For SCell3 which is with a SCS of DL BWP that is larger than SCS of UL BWP of SCell1, the UE may include one or more locations for a fourth subset of one or more occasions associated with slots $\{n-1, n-2, n-4, n-6\}$ (e.g., the UE may include the one or more locations associated with the fourth subset of one or more occasions in the HARQ codebook).

The fourth subset of one or more occasions comprises occasion(s) in 8 DL slots due to the SCS difference.

In some examples, based on FIG. 5, one DL slot may comprise and/or refer to one or more occasions.

Figure 8:
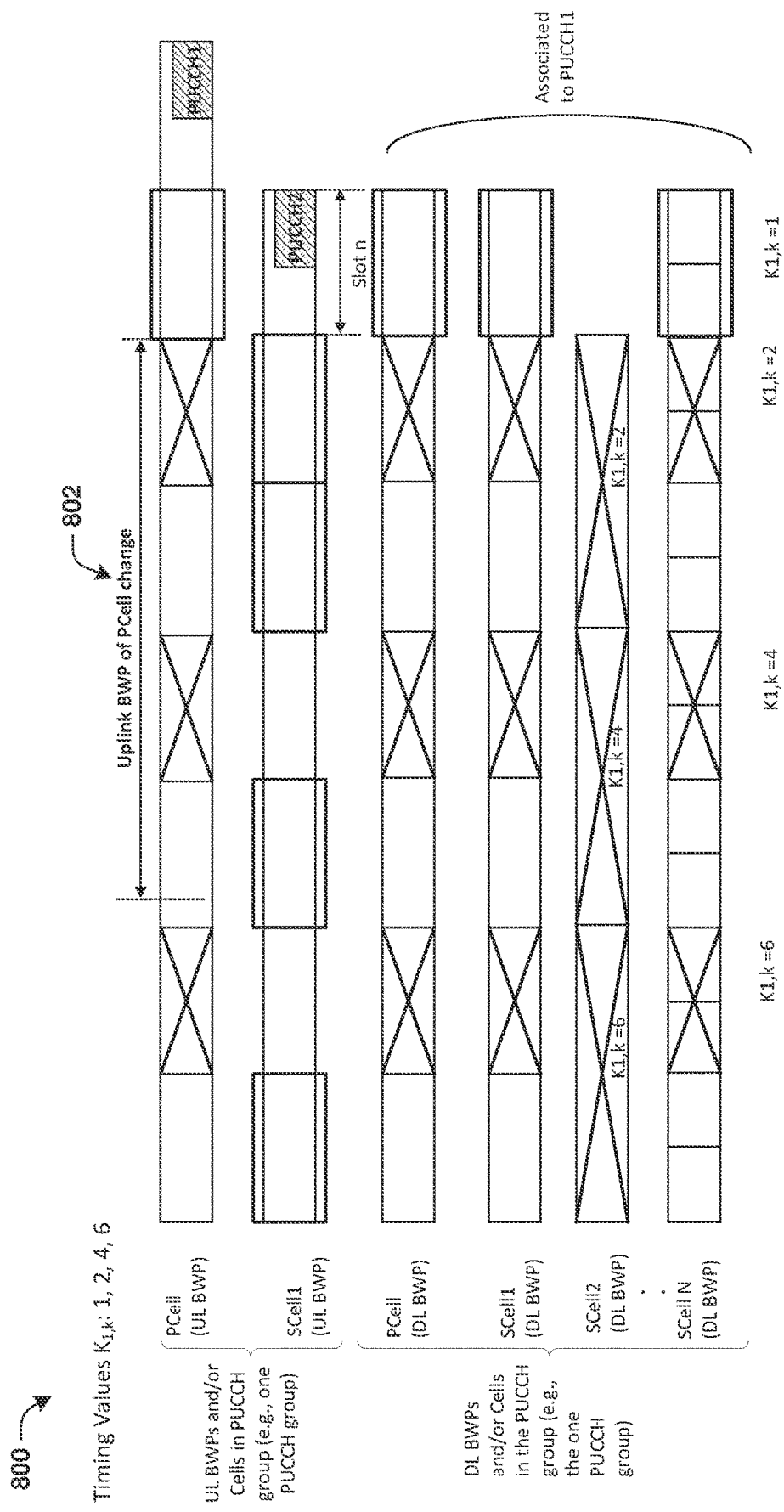
FIG. 8 is a diagram illustrating an exemplary scenario associated with a UE according to one exemplary embodiment.

FIG. 8 illustrates a scenario 800 associated with the UE. For example, in the scenario 800, for a PCell, the UE is scheduled to transmit PUCCH1 (e.g., a PUCCH comprising a HARQ codebook) on slot n+1 in PCell. HARQ information associated with one or more occasions before an active UL BWP change 802 (e.g., active UL BWP change 802 of the PCell) may not be included in the HARQ codebook.

Figure 9A:
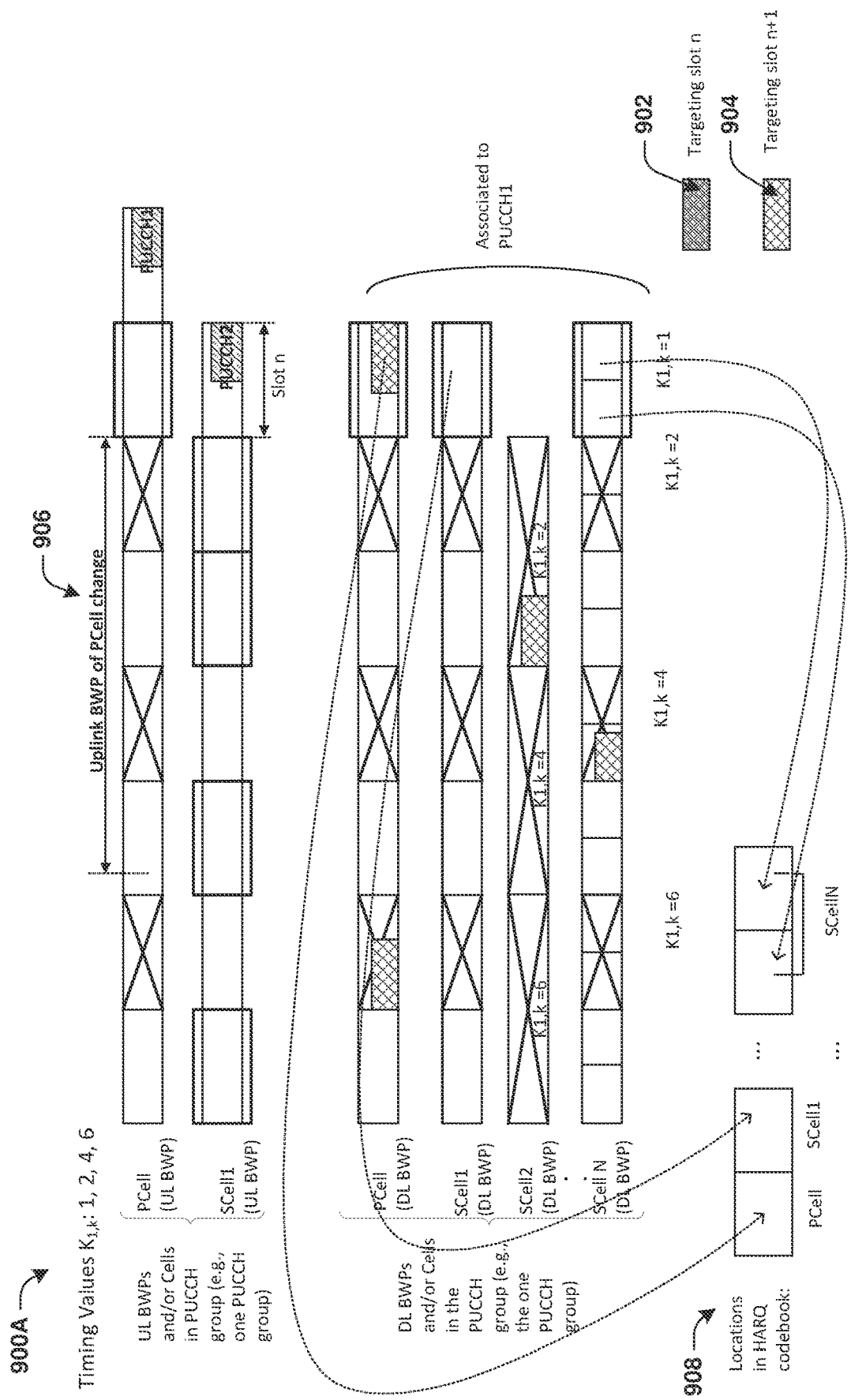
FIG. 9A is a diagram illustrating an exemplary scenario associated with a UE according to one exemplary embodiment.
Figure 9B:
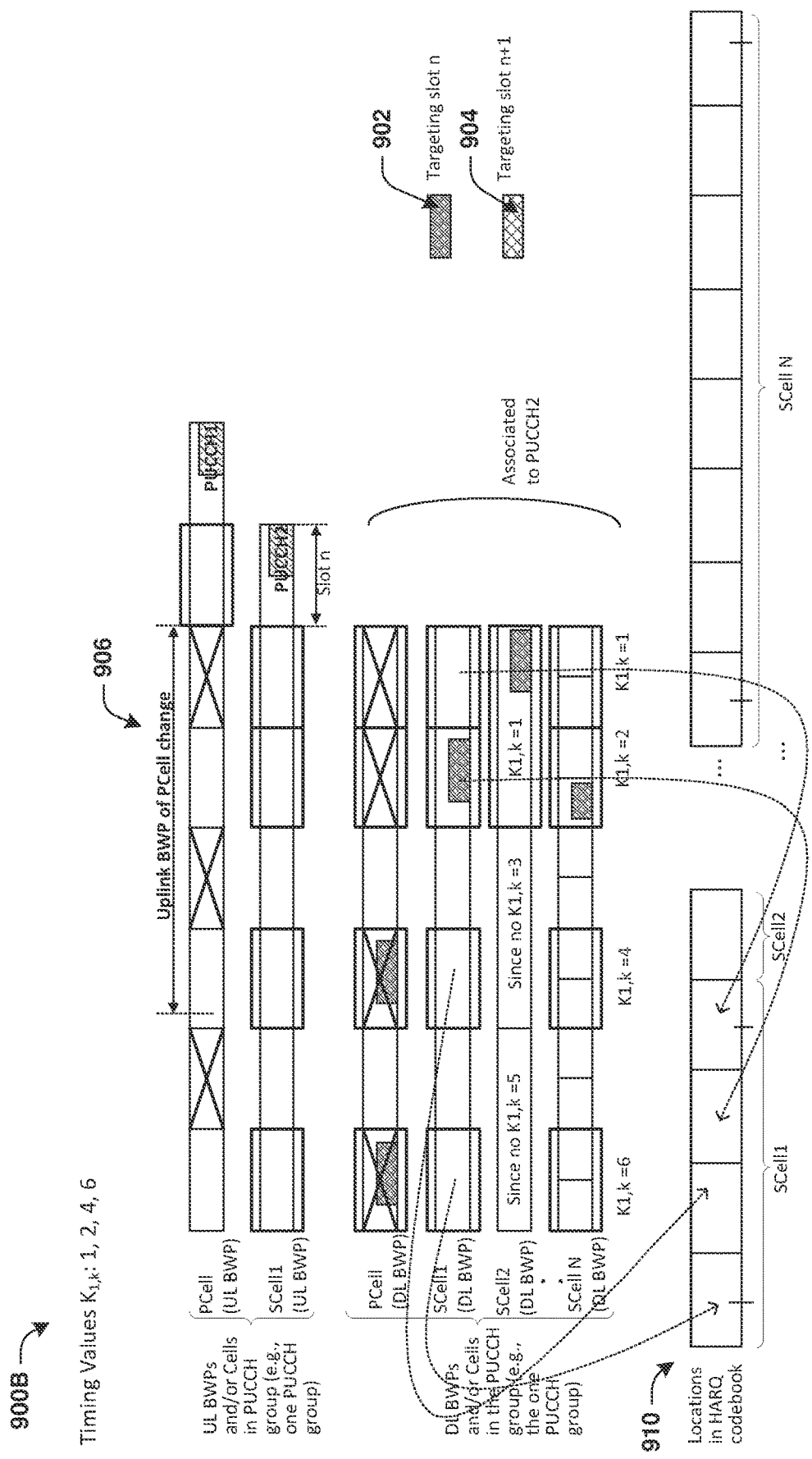
FIG. 9B is a diagram illustrating an exemplary scenario associated with a UE according to one exemplary embodiment.

FIGS. 9A and 9B illustrate scenarios 900A and 900B, respectively, associated with the UE. FIGS. 9A and 9B illustrate locations in HARQ codebook associated with one or more occasions. Boxes (rectangular boxes) with a first pattern 902 are occasions that are associated with slot n and/or SCell1. Boxes (rectangular boxes) with a second pattern 904 are occasions that are associated with slot n+1 and/or PCell. In some examples, in the scenarios 900A and/or 900B, the UE may receive up to one PDSCH in one slot (e.g., there is at most one occasion in a single slot).

FIG. 9A shows locations 908 of a first HARQ codebook transmitted in PUCCH1 on slot n+1 in the PCell. In the scenario 900A (shown in FIG. 9A), occasions associated with slot n (e.g., only the occasions associated with slot n) are considered in PUCCH1 in slot n+1 since slot n is after an active UL BWP change 906 of PCell (e.g., merely HARQ information that is in response to occasions associated with slot n is included in the first HARQ codebook transmitted via the PUCCH1 in slot n+2, such as shown in FIG. 9A by the first HARQ codebook merely having locations associated with occasions that are associated with slot n).

FIG. 9B shows locations 910 of a second HARQ codebook transmitted in PUCCH2 on slot n in SCell1. In the scenario 900B (shown in FIG. 9B), since the PCell may also have an active DL BWP change (in addition to the active UL BWP change 906 of the PCell, for example), there may be no location associated with PCell (e.g., no location associated with the PCell is in the second HARQ codebook). In some examples, the second HARQ codebook has four locations associated with SCell1 (as shown in FIG. 9B). In some examples, the second HARQ codebook has one location associated with SCell2 (as shown in FIG. 9B). In some examples, the second HARQ codebook has eight locations associated with SCell N (as shown in FIG. 9B).

Figure 10:
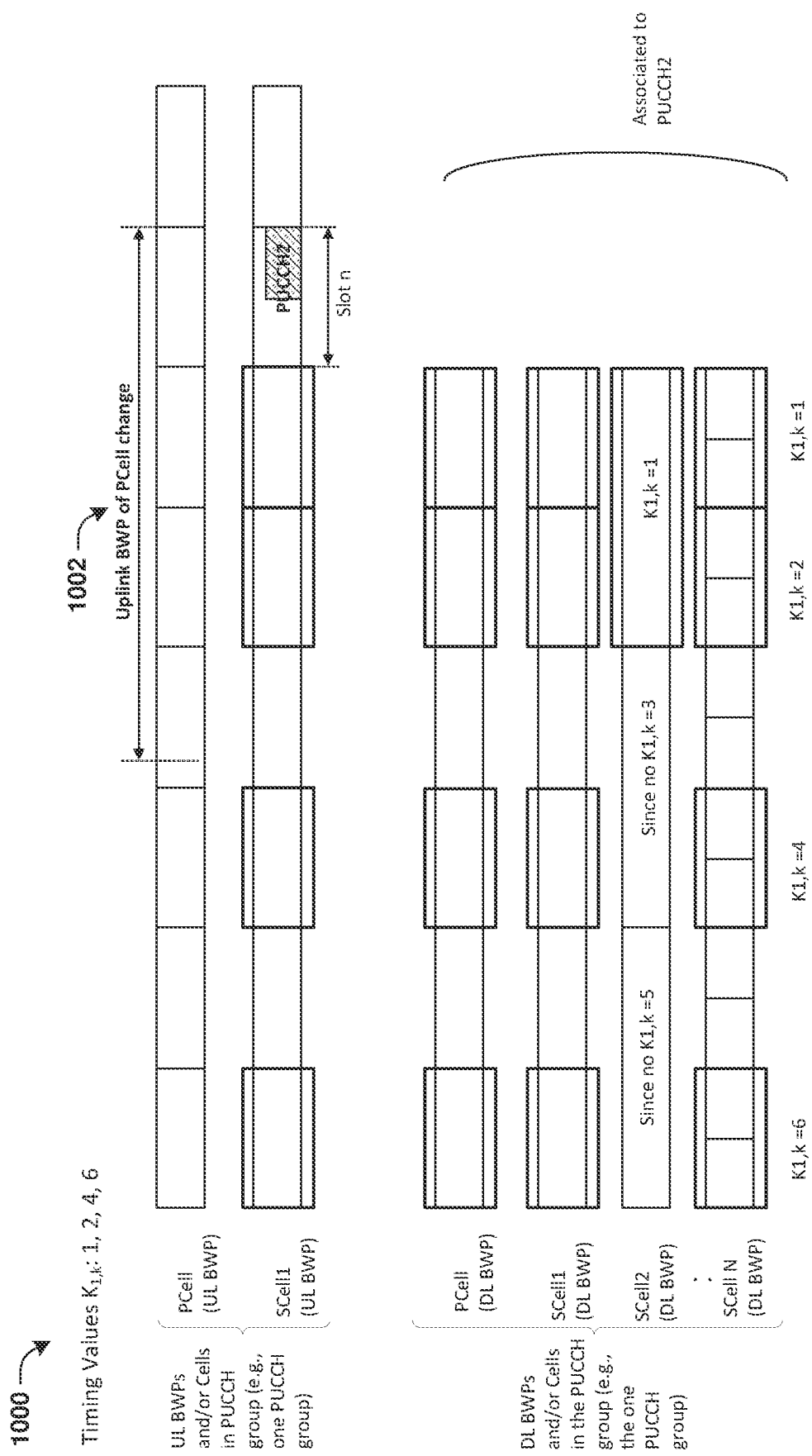
FIG. 10 is a diagram illustrating an exemplary scenario associated with a UE according to one exemplary embodiment.

FIG. 10 illustrates a scenario 1000 associated with the UE. For example, in the scenario 1000, PUCCH2 (e.g., transmission of a PUCCH, comprising a HARQ codebook, on slot n in SCell1) may be during a transition time of an active UL BWP change 1002 of PCell.

Figure 11:
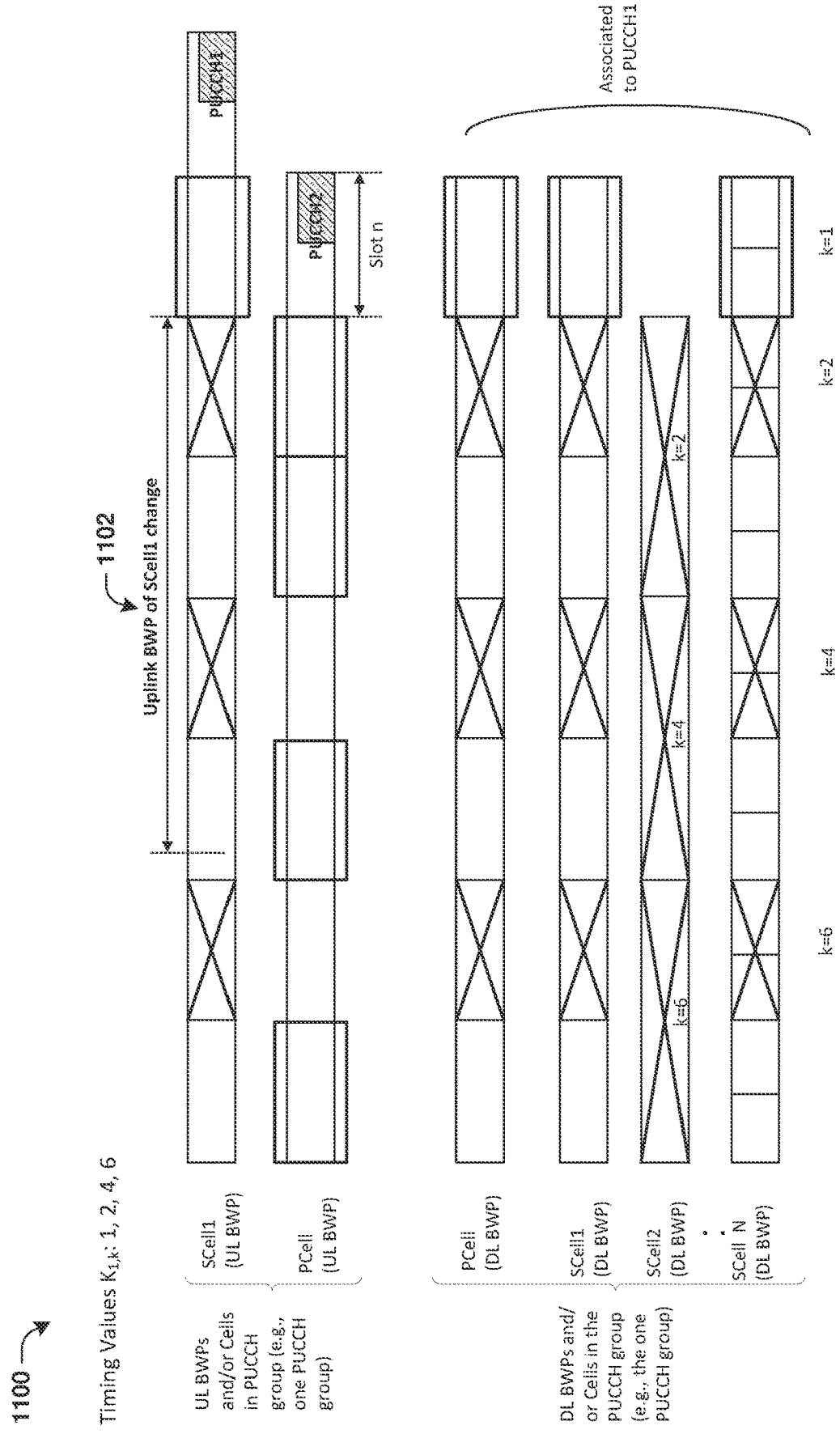
FIG. 11 is a diagram illustrating an exemplary scenario associated with a UE according to one exemplary embodiment.

FIG. 11 illustrates a scenario 1100 associated with the UE. For example, in the scenario 1100, PUCCH1 is on SCell1 and PUCCH2 is on PCell. The UE changes 1102 an active UL BWP of SCell1 before (and/or until) slot n. In slot n+1, the UE may transmit PUCCH (e.g., PUCCH1) comprising a HARQ codebook. Since there is the active UL BWP change 1102 on SCell1, HARQ information associated with one or more occasions before slot n may not be included in the HARQ codebook. For example, the HARQ codebook may not comprise HARQ information that is in response to occasions that are before slot n. The HARQ codebook may comprises HARQ information that is in response to one or more occasions in slot n (which is associated with a timing value "1" of a set of timing values $K_{1,k}$ (e.g., $K_{1,k}=1$), for example).

Figure 12:
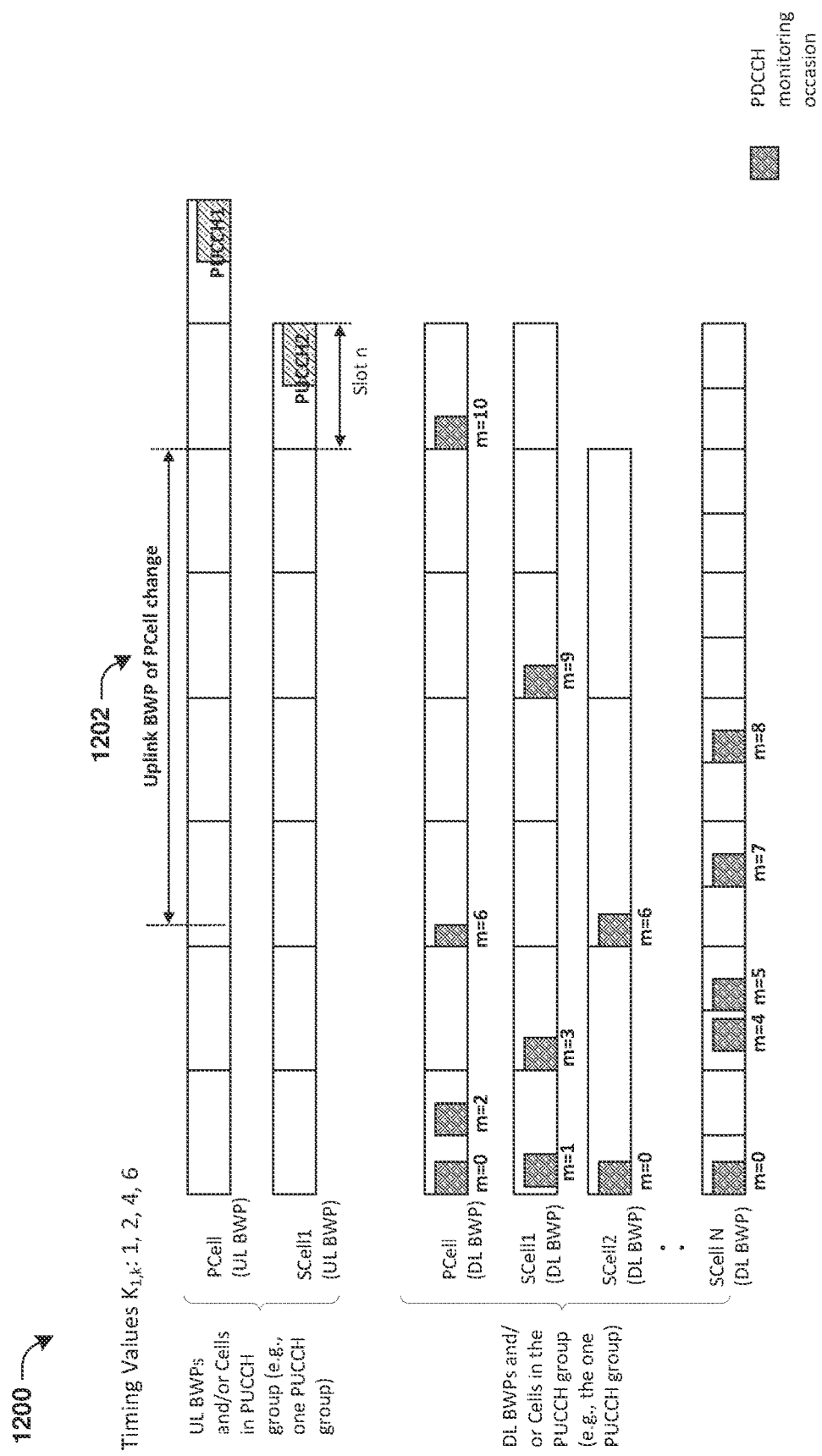
FIG. 12 is a diagram illustrating an exemplary scenario associated with a UE according to one exemplary embodiment.

FIG. 12 illustrates a scenario 1200 associated with the UE. For example, in the scenario 1200, the UE may be configured with one or more PUCCH resources on two serving cells in the same PUCCH group (e.g., the two serving cells may comprise PCell and SCell1). PDCCHs on PDCCH monitoring occasions {m=0~m=9} are associated with PUCCH2 (e.g., the PUCCH2 may correspond to transmission in slot n on SCell1 of a PUCCH comprising a first HARQ codebook). In some examples, one or more PDCCHs of the PDCCHs on the PDCCH monitoring occasions {m=0~m=9} are indicative of information for deriving slot n for transmitting HARQ information (e.g., transmitting the first HARQ codebook). The UE may determine that slot n is associated with SCell1 (e.g., the UE may determine that slot n is associated with SCell 1 based upon the one or more PDCCHs and/or based on a configured time pattern). In some examples, one or more PDCCHs on the PDCCH monitoring occasions {m=0~m=9} may indicate information for determining SCell1 for transmitting HARQ information (e.g., transmitting the first HARQ codebook), such as where a bit (e.g., one bit) of a PDCCH of the one or more PDCCHs indicates whether to use PCell or SCell1 for transmitting the HARQ information. In some examples, a same starting orthogonal frequency-division multiplexing (OFDM) symbol may correspond to a same PDCCH monitoring occasion. In the scenario 1200, the UE may include locations, associated with PDCCH monitoring occasions {m=0~m=9} in a HARQ codebook (e.g., the first HARQ codebook). Alternatively and/or additionally, the UE may generate a HARQ codebook (e.g., the first HARQ codebook) comprising HARQ information that is in response to the PDCCH monitoring occasions {m=0~m=9}. In some examples, if PDCCH monitoring occasions {m=0~m=10} are associated with PCell, PUCCH1 and/or slot n+1, the UE may not include location for PDCCH monitoring occasions {m=0~m=9} (e.g., the UE may not include the locations for PDCCH monitoring occasions {m=0~m=9} in a HARQ codebook, such as the first HARQ codebook), and/or the UE may generate a HARQ codebook comprising HARQ information that is in response to PDCCH monitoring occasion {m=10}.

Figure 13:
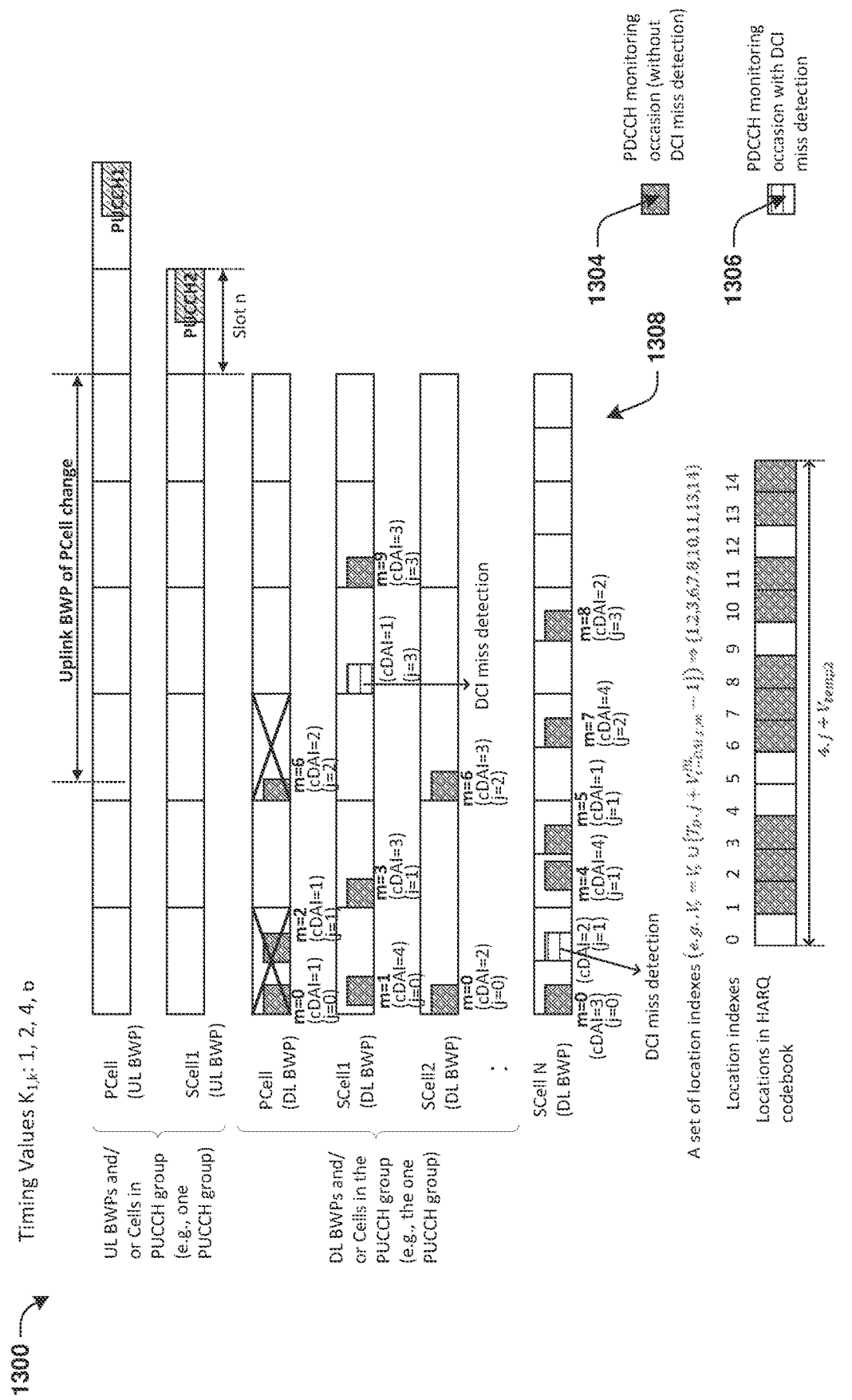
FIG. 13 is a diagram illustrating an exemplary scenario associated with a UE according to one exemplary embodiment.

FIG. 13 illustrates a scenario 1300 associated with the UE. FIG. 12 may show an example in UE side for determining (e.g., deriving) a set of PDCCH monitoring occasions. An upper side 1308 of FIG. 13 may correspond to an example (from network side, for example) for transmitting PDCCH. For example, occasions in which DCIs transmitted by the network are not detected by the UE may be shown in the upper side 1308. The UE miss detects DCI (e.g., misses detection of DCI) in two PDCCH monitoring occasions. PDCCH monitoring occasions (in which detection of DCI is not missed by the UE, for example) are shown with a first pattern 1304. The two PDCCH monitoring occasions in which the UE misses detection of DCI are shown with a second pattern 1306. In FIG. 13, the UE may determine a set of location indexes based on the set of PDCCH monitoring occasions (m=0~m=9). The set of location indexes may be based on a number of groups (e.g., j) and a counter DAI (cDAI) (e.g., the set of location indexes may be based on a number of groups and a cDAI in each received DCI targeting slot n) (and/or based on other data in addition to the number of groups and the cDAI). In the scenario 1300, the set of location indexes may be {1, 2, 3, 6, 7, 8, 10, 11, 13, 14}. In other words, the UE may generate HARQ information in response to PDCCH monitoring occasions on locations associated with the set of location indexes. Since PCell may have an active DL BWP change, HARQ information in response to m=0, m=2, m=6 on PCell may not be included in the HARQ codebook. HARQ information in response to PDCCH monitoring occasion m=0 on SCell2 is placed on a location (of the HARQ codebook, for example) associated with location index 1. HARQ information in response to PDCCH monitoring occasion m=0 on SCell N is placed on a location (of the HARQ codebook, for example) associated with location index 2. HARQ information in response to PDCCH monitoring occasion m=1 on SCell1 is placed on location (of the HARQ codebook, for example) associated with location index 3. In some examples, HARQ information may be placed (e.g., arranged in the HARQ codebook) based on ascending order of cell index for a same monitoring occasion. For remaining locations 0, 4, 5, 9, 12, the UE may set (e.g., place) NACK (e.g., at locations with location indexes 0, 4, 5, 9 and 12, the HARQ codebook may indicate NACK). In some examples, a size of the HARQ codebook may be determined based on the number of groups (e.g., j) and a second temp value (and/or based on data in addition to the number of groups and the second temp value). In some examples, the second temp value may be set based on a total DAI (e.g., tDAI) in a DCI and/or a counter DAI (e.g., cDAI) in a DCI. In some examples, the DCI (e.g., indicative of the tDAI and/or the cDAI) corresponds to the DCI in a last PDCCH monitoring occasion of the set of PDCCH monitoring occasions.

One, some and/or all of the foregoing examples, concepts, techniques and/or embodiments can be formed and/or combined to a new embodiment.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

With respect to one or more embodiments herein, such as one or more techniques, devices, concepts, methods, example scenarios and/or alternatives described above, in some examples, one or more occasions (e.g., at least one of a set of occasions, a set of monitoring occasions, an occasion, a monitoring occasion, a PDCCH monitoring occasion, a set of PDCCH monitoring occasions, etc.) are associated with type-1 codebook or are associated with type-2 codebook. In an example in which the one or more occasions are associated with type-1 codebook, information (e.g., one or more locations) associated with the one or more occasions may be included in a HARQ codebook that is a type-1 codebook. In an example in which the one or more occasions are associated with type-2 codebook, information (e.g., one or more locations) associated with the one or more occasions may be included in a HARQ codebook that is a type-2 codebook. In the example in which the one or more occasions are associated with type-2 codebook, the one or more occasions may be one or more PDCCH monitoring occasions.

With respect to one or more embodiments herein, in some examples, one or more PDCCH monitoring occasions (e.g., a PDCCH monitoring occasion and/or a set of PDCCH monitoring occasions) are associated with type-2 codebook.

With respect to one or more embodiments herein, in some examples, the UE may be configured with type-1 codebook (e.g., semi-static codebook) or type-2 codebook for a PUCCH group (e.g., dynamic codebook).

With respect to one or more embodiments herein, in some examples, type-1 codebook may correspond to semi-static codebook and/or type-2 codebook may correspond to dynamic codebook.

With respect to one or more embodiments herein, in some examples, the first cell is a PCell, a PSCell or a first SCell.

With respect to one or more embodiments herein, in some examples, the second cell is a PCell, a PSCell or a second SCell.

With respect to one or more embodiments herein, in some examples, the first cell and the second cell are in a same PUCCH group.

With respect to one or more embodiments herein, in some examples, one or more PUCCH resources associated with the first cell (e.g., one or more PUCCH resources, of the first cell, with which the UE is configured) and one or more PUCCH resources associated with the second cell (e.g., one or more PUCCH resources, of the second cell, with which the UE is configured) are in a same PUCCH group.

With respect to one or more embodiments herein, in some examples, a DCI (e.g., a DCI without downlink assignment) for beam indication may be used to update and/or indicate a DL and/or UL Transmission Configuration Indication (TCI) state. For example, a TCI field of the DCI may be indicative of the TCI state (and/or the TCI state may be updated based on the TCI field).

With respect to one or more embodiments herein, in some examples, in response to (e.g., upon) receiving the DCI for beam indication, the UE may update a DL beam for one or more DL channels (e.g., one or more UE-specific DL channels) and/or one or more DL signals (e.g., one or more UE-specific DL signals).

With respect to one or more embodiments herein, in some examples, in response to (e.g., upon) receiving the DCI for beam indication, the UE may update a UL beam for one or more UL channels (e.g., one or more UE-specific UL channels) and/or one or more UL signals (e.g., one or more UE-specific UL signals).

With respect to one or more embodiments herein, in some examples, in response to (e.g., upon) receiving the DCI for beam indication, the UE may update a DL beam and a UL beam for one or more channels (e.g., one or more UE-specific channels) and/or one or more signals (e.g., one or more UE-specific signals).

With respect to one or more embodiments herein, in some examples, the DCI (e.g., DCI without downlink assignment) for beam indication is with CRC scrambled by Configured Scheduling Radio Network Temporary Identifier (CS-RNTI) (e.g., CS-RNTI is a Radio Network Temporary Identifier (RNTI) that is different than Cell Radio Network Temporary Identifier (C-RNTI)).

With respect to one or more embodiments herein, in some examples, a set of timing values (e.g., $K_0$) may comprise one or more timing values, wherein a timing value of the one or more timing values corresponds to a slot offset from a slot of PDCCH to a slot of PDSCH, such as where the slot of PDCCH corresponds to a slot in which a PDCCH is received and where the slot of PDSCH corresponds to a slot in which a PDSCH is received.

With respect to one or more embodiments herein, in some examples, for type-1 HARQ codebook comprising HARQ information in response to a sidelink transmission, one or more occasions (e.g., at least one of a set of occasions, a set of monitoring occasions, an occasion, a monitoring occasion, a PDCCH monitoring occasion, a set of PDCCH monitoring occasions, etc.) may correspond to (e.g., may refer to) one or more candidate Physical Sidelink Shared Channel (PSSCH) transmissions, such as one or more candidate PSSCH transmissions with one or more corresponding Physical Sidelink Feedback Channel (PSFCH) reception occasions for which the UE can multiplex corresponding HARQ-ACK information in a PUCCH transmission in slot $n_U$.

In the present disclosure, one, some and/or all instances of "one PDCCH monitoring occasion" may be replaced with "one or more PDCCH monitoring occasions".

In the present disclosure, one, some and/or all instances of "one cell" may be replaced with "one or more cells".

In the present disclosure, one, some and/or all instances of the term "before" may be replaced with and/or may be used interchangeably with "earlier than" and/or "preceding".

In the present disclosure, one, some and/or all instances of the term "cell" may be replaced with and/or may be used interchangeably with "carrier/cell" and/or "carrier".

In the present disclosure, one, some and/or all instances of the term "carrier" may be replaced with and/or may be used interchangeably with "carrier/cell" and/or "cell".

In some examples, for type-2 HARQ codebook comprising HARQ information in response to a sidelink transmission, one or more PDCCH monitoring occasions may correspond to (e.g., may refer to) PDCCH with DCI format 3_0 for scheduling one or more PSSCH transmissions, such as one or more PSSCH transmissions with one or more corresponding PSFCH reception occasions on an active DL BWP of a serving cell c (as described in Clause 10.1 of 3GPP TS 38.213 V16.5.0, for example), wherein, for the one or more PDCCH monitoring occasions, the UE transmits HARQ-ACK information in a same PUCCH in slot n based on (i) one or more PSFCH-to-HARQ_feedback timing indicator field values, or a value provided by sl-PSFCH-ToPUCCH-CG-Type1, for PUCCH transmission with HARQ-ACK information in slot n in response to PSFCH receptions; (ii) a time gap field in DCI format 3_0 for scheduling PSSCH transmissions with associated PSFCH receptions; (iii) a time resource assignment in DCI format 3_0 for scheduling PSSCH transmissions with associated PSFCH receptions; (iv) a set of configured sidelink resource pool bitmaps; (v) a value of a period of PSFCH resources provided in sl-PSFCH-Period; and/or (vi) a value of a minimum time gap provided in sl-MinTimeGapPSFCH.

In some examples, $c_{PUCCH}$ is for transmitting PUCCH and/or the HARQ codebook (e.g., $c_{PUCCH}$ may be used for transmitting the PUCCH and/or the HARQ codebook in a slot $n_u$, such as where the PUCCH, comprising the HARQ codebook, is transmitted on $c_{PUCCH}$ in the slot $n_u$).

In some examples, $c_{PUCCH}$ comprises a PCell and/or one or more SCells with one or more PUCCH resources in a PUCCH group (e.g., PUCCH resources of the PCell and/or the one or more SCells may be in the same PUCCH group).

In some examples, $c_{PUCCH}$ comprises one or more SCells with one or more PUCCH resource in a PUCCH group (e.g., PUCCH resources of the one or more SCells may be in the same PUCCH group).

To enhance 3GPP specification for wireless communication in accordance with some embodiments herein, Enhancements 1-4 are provided herein. Enhancements 1-4 are reflective of implementation in accordance with some embodiments herein, and comprise modifications to various sections of 3GPP specifications. According to some embodiments, one, some and/or all of Enhancements 1-4 may be implemented and/or a portion of one, some and/or all of Enhancements 1-4 may be implemented.

Enhancements 1-2 comprises modifications to 3GPP TS 38.213 V16.5.0. An original portion of 3GPP TS 38.213 V16.5.0, without any modifications of Enhancement 1-2, is quoted in the following quotation (some parts of the original portion are not included in the quotation):

while k<C($K_1$)
  if mod ($n_U$–$K_{1,k}$+1,max ($2^{\mu_{DL}-\mu_{UL}}$,1))=0
  Set $n_D$=0—index of a DL slot within an UL slot
    while $n_D$<max($2^{\mu_{DL}-\mu_{UL}}$,1)
      Set R to the set of rows
      Set c(R) to the cardinality of R
      Set r=0—index of row in set R
      if slot $n_U$ starts at a same time as or after a slot for an active DL BWP change on serving cell c or an active UL BWP change on the PCell and slot
      $\lfloor (n_U - K_{1,k}) \cdot 2^{\mu_{DL}-\mu_{UL}} \rfloor + n_D$ is before the slot for the active DL BWP change on serving cell c or the active UL BWP change on the PCell
      $n_D$=$n_D$+1;
      . . .
    end if
  end while
  end if
  k=k+1;
end while In Enhancement 1, two instances of "PCell" are each changed to "cell associated with the slot $n_U$". Additions 1-2 and removals 1-2 are made to the original portion of 3GPP TS 38.213 V16.5.0 in accordance with some embodiments of the present disclosure. To distinguish addition 1 from what is originally included in the original portion of 3GPP TS 38.213 V16.5.0, addition 1 is in bold, and is preceded by the term "ADDITION 1 STARTS:" and followed by the term "ADDITION 1 ENDS". To distinguish addition 2 from what is originally included in the original portion of 3GPP TS 38.213 V16.5.0, addition 2 is in bold, and is preceded by the term "ADDITION 2 STARTS:" and followed by the term "ADDITION 2 ENDS". Addition 1 and addition 2 are each an addition of the term "cell associated with the slot $n_u$" to replace the term "PCell". Removals 1-2 are made to the original portion of 3GPP TS 38.213 V16.5.0 to remove the term "PCell". Removal 1 is preceded by the term "REMOVAL 1 STARTS:" and followed by the term "REMOVAL 1 ENDS". Removal 2 is preceded by the term "REMOVAL 2 STARTS:" and followed by the term "REMOVAL 2 ENDS".

Enhancement 1:
while k<C($K_1$)
  if mod ($n_U$–$K_{1,k}$+1,max ($2^{\mu_{DL}-\mu_{UL}}$,1))=0
  Set $n_D$=0—index of a DL slot within an UL slot
    while $n_D$<max($2^{\mu_{DL}-\mu_{UL}}$,1)
      Set R to the set of rows
      Set c(R) to the cardinality of R
      Set r=0—index of row in set R
      if slot $n_U$ starts at a same time as or after a slot for an active DL BWP change on serving cell c or an active UL BWP change on the ADDITION 1 STARTS: cell associated with the slot $n_U$ ADDITION 1 ENDS REMOVAL 1 STARTS: PCell REMOVAL 1 ENDS and slot $\lfloor (n_U - K_{1,k}) \cdot 2^{\mu_{DL}-\mu_{UL}} \rfloor + n_D$ is before the slot for the active DL BWP change on serving cell c or the active UL BWP change on the ADDITION 2 STARTS: cell associated with the slot $n_U$ ADDITION 2 ENDS REMOVAL 2 STARTS: PCell REMOVAL 2 ENDS
      $n_D$=$n_D$+1;
      . . .
    end if
  end while end if
k=k+1;
end while For clarity, a version of Enhancement 1 is provided without indications of the beginnings and endings of additions 1-2 and without indications of removals 1-2:

while k<C($K_1$))
  if mod ($n_U$−$K_{1,k}$+1,max ($2^{\mu_{DL}-\mu_{UL}}$,1))=0
    Set $n_D$=0—index of a DL slot within an UL slot
    while $n_D$<max($2^{\mu_{DL}-\mu_{UL}}$,1)
      Set R to the set of rows
      Set c(R) to the cardinality of R
      Set r=0—index of row in set R
      if slot $n_U$ starts at a same time as or after a slot for an active DL BWP change on serving cell c or an active UL BWP change on the cell associated with the slot $n_u$ and slot $\lfloor (n_U-K_{1,k}) \cdot 2^{\mu_{DL}-\mu_{UL}} \rfloor +n_D$ is before the slot for the active DL BWP change on serving cell c or the active UL BWP change on the cell associated with the slot $n_u$
        $n_D$=$n_D$+1;
      ...
      end if
    end while
  end if
  k=k+1;
end while In Enhancement 2, two instances of "PCell" are each changed to "serving cell $c_{PUCCH}$ (or on the serving cell c)". Additions 3-4 and removals 3-4 are made to the original portion of 3GPP TS 38.213 V16.5.0 in accordance with some embodiments of the present disclosure. To distinguish addition 3 from what is originally included in the original portion of 3GPP TS 38.213 V16.5.0, addition 3 is in bold, and is preceded by the term "ADDITION 3 STARTS:" and followed by the term "ADDITION 3 ENDS". To distinguish addition 4 from what is originally included in the original portion of 3GPP TS 38.213 V16.5.0, addition 4 is in bold, and is preceded by the term "ADDITION 4 STARTS:" and followed by the term "ADDITION 4 ENDS". Addition 3 and addition 4 are each an addition of the term "serving cell $c_{PUCCH}$ (or on the serving cell c)" to replace the term "PCell". Removals 3-4 are made to the original portion of 3GPP TS 38.213 V16.5.0 to remove the term "PCell". Removal 3 is preceded by the term "REMOVAL 3 STARTS:" and followed by the term "REMOVAL 3 ENDS". Removal 4 is preceded by the term "REMOVAL 4 STARTS:" and followed by the term "REMOVAL 4 ENDS".

Enhancement 2:
while k<C($K_1$))
  if mod ($n_U$−$K_{1,k}$+1,max ($2^{\mu_{DL}-\mu_{UL}}$,1))=0
    Set $n_D$=0—index of a DL slot within an UL slot
    while $n_D$<max($2^{\mu_{DL}-\mu_{UL}}$,1)
      Set R to the set of rows
      Set c(R) to the cardinality of R
      Set r=0—index of row in set R
      if slot $n_U$ starts at a same time as or after a slot for an active DL BWP change on serving cell c or an active UL BWP change on the ADDITION 3 STARTS: serving cell $c_{PUCCH}$ (or on the serving cell c) ADDITION 3 ENDS REMOVAL 3 STARTS: PCell REMOVAL 3 ENDS and slot $\lfloor (n_U-K_{1,k}) \cdot 2^{\mu_{DL}-\mu_{UL}} \rfloor +n_D$ is before the slot for the active DL BWP change on serving cell c or the active UL BWP change on the ADDITION 4 STARTS: serving cell $c_{PUCCH}$ (or on the serving cell c) ADDITION 4 ENDS REMOVAL 4 STARTS: PCell REMOVAL 4 ENDS
        $n_D$=$n_D$+1;
      ...
      end if
    end while
  end if
  k=k+1;
end while For clarity, a version of Enhancement 2 is provided without indications of the beginnings and endings of additions 3-4 and without indications of removals 3-4:

while k<C($K_1$))
  if mod ($n_U$−$K_{1,k}$+1,max ($2^{\mu_{DL}-\mu_{UL}}$,1))=0
    Set $n_D$=0—index of a DL slot within an UL slot
    while $n_D$<max($2^{\mu_{DL}-\mu_{UL}}$,1)
      Set R to the set of rows
      Set c(R) to the cardinality of R
      Set r=0—index of row in set R
      if slot $n_U$ starts at a same time as or after a slot for an active DL BWP change on serving cell c or an active UL BWP change on the serving cell $c_{PUCCH}$ (or on the serving cell c) and slot $\lfloor (n_U)-K_{1,k}) \cdot 2^{\mu_{DL}-\mu_{UL}} \rfloor +n_D$ is before the slot for the active DL BWP change on serving cell c or the active UL BWP change on the serving cell $c_{PUCCH}$ (or on the serving cell c)
        $n_D$=$n_D$+1;
      ...
      end if
    end while
  end if
  k=k+1;
end while Enhancements 3-4 comprises modifications to 3GPP TS 38.213 V16.5.0. An original portion of 3GPP TS 38.213 V16.5.0, without any modifications of Enhancement 3-4, is quoted in the following quotation (some parts of the original portion are not included in the quotation):

while Set M to the number of PDCCH monitoring occasion(s)
  while m<M
    Set c=0—serving cell index: lower indexes correspond to lower RRC indexes of corresponding cell
    while c<$N_{cells}^{DL}$
      if PDCCH monitoring occasion m is before an active DL BWP change on serving cell c or an active UL BWP change on the PCell and an active DL BWP change is not triggered in PDCCH monitoring occasion
        c=c+1;
      ...
      end if
    end while
    m=m+1
  end while In Enhancement 3, an instance of "PCell" is changed to "cell associated with the slot $n_U$". Addition 5 and removal 5 are made to the original portion of 3GPP TS 38.213 V16.5.0 in accordance with some embodiments of the present disclosure. To distinguish addition 5 from what is originally included in the original portion of 3GPP TS 38.213 V16.5.0, addition 5 is in bold, and is preceded by the term "ADDITION 5 STARTS:" and followed by the term "ADDITION 5 ENDS". Removal 5 is preceded by the term "REMOVAL 5 STARTS:" and followed by the term "REMOVAL 5 ENDS".

Enhancement 3:
while Set M to the number of PDCCH monitoring occasion(s)
　　while m<M
　　　　Set c=0—serving cell index: lower indexes correspond to lower RRC indexes of corresponding cell
　　　　while c<$N_{cells}^{DL}$
　　　　　　if PDCCH monitoring occasion m is before an active DL BWP change on serving cell c or an active UL BWP change on the ADDITION 5 STARTS: cell associated with the slot $n_U$ ADDITION 5 ENDS REMOVAL 5 STARTS: PCell REMOVAL 5 ENDS and an active DL BWP change is not triggered in PDCCH monitoring occasion
　　　　　　　　c=c+1;
　　　　　　　　. . .
　　　　　　end if
　　　　end while
　　　　m=m+1
　　end while For clarity, a version of Enhancement 3 is provided without indications of the beginning and ending of addition 5 and without an indication of removal 5:
while Set M to the number of PDCCH monitoring occasion(s)
　　while m<M
　　　　Set c=0—serving cell index: lower indexes correspond to lower RRC indexes of corresponding cell
　　　　while c<$N_{cells}^{DL}$
　　　　　　if PDCCH monitoring occasion m is before an active DL BWP change on serving cell c or an active UL BWP change on the cell associated with the slot $n_u$ and an active DL BWP change is not triggered in PDCCH monitoring occasion
　　　　　　　　c=c+1;
　　　　　　　　. . .
　　　　　　end if
　　　　end while
　　　　m=m+1
　　end while In Enhancement 4, an instance of "PCell" is changed to "serving cell $c_{PUCCH}$ (or on the serving cell c)". Addition 6 and removal 6 are made to the original portion of 3GPP TS 38.213 V16.5.0 in accordance with some embodiments of the present disclosure. To distinguish addition 6 from what is originally included in the original portion of 3GPP TS 38.213 V16.5.0, addition 6 is in bold, and is preceded by the term "ADDITION 6 STARTS:" and followed by the term "ADDITION 6 ENDS". Removal 6 is preceded by the term "REMOVAL 6 STARTS:" and followed by the term "REMOVAL 6 ENDS".

Figure 14:
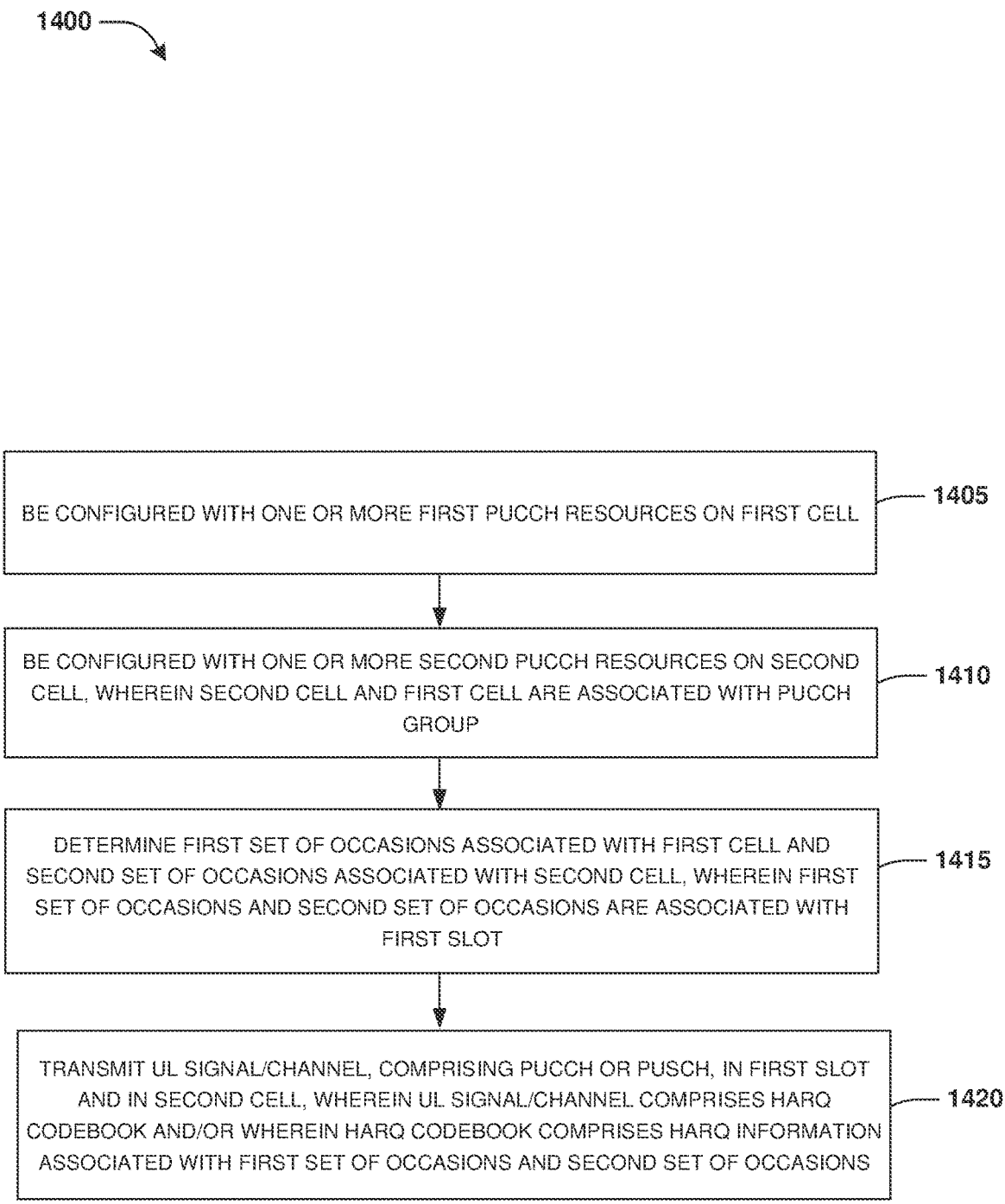
FIG. 14 is a flow chart according to one exemplary embodiment.

Enhancement 4:
while Set M to the number of PDCCH monitoring occasion(s)
　　while m<M
　　　　Set c=0—serving cell index: lower indexes correspond to lower RRC indexes of corresponding cell
　　　　while c<$N_{cells}^{DL}$
　　　　　　if PDCCH monitoring occasion m is before an active DL BWP change on serving cell c or an active UL BWP change on the ADDITION 6 STARTS: serving cell $c_{PUCCH}$ (or on the serving cell c) ADDITION 6 ENDS REMOVAL 6 STARTS: PCell REMOVAL 6 ENDS and an active DL BWP change is not triggered in PDCCH monitoring occasion
　　　　　　　　c=c+1;
　　　　　　　　. . .
　　　　　　end if
　　　　end while
　　　　m=m+1
　　end while For clarity, a version of Enhancement 4 is provided without indications of the beginning and ending of addition 5 and without an indication of removal 5:
while Set M to the number of PDCCH monitoring occasion(s)
　　while m<M
　　　　Set c=0—serving cell index: lower indexes correspond to lower RRC indexes of corresponding cell
　　　　while c<$N_{cells}^{DL}$
　　　　　　if PDCCH monitoring occasion m is before an active DL BWP change on serving cell c or an active UL BWP change on the serving cell $c_{PUCCH}$ (or on the serving cell c) and an active DL BWP change is not triggered in PDCCH monitoring occasion
　　　　　　　　c=c+1;
　　　　　　　　. . .
　　　　　　end if
　　　　end while
　　　　m=m+1
　　end while FIG. 14 is a flow chart 1400 according to one exemplary embodiment from the perspective of a UE in a wireless communication system. In step 1405, the UE is configured with one or more first PUCCH resources on a first cell. For example, the one or more first PUCCH resources may be associated with one or more first UL BWPs of the first cell (e.g., the UE may be configured with the one or more first PUCCH resources on the one or more first UL BWPs of the first cell). In some examples, the UE is configured with the one or more first PUCCH resources via reception of a signal/channel comprising a configuration of the one or more first PUCCH resources. In step 1410, the UE is configured with one or more second PUCCH resources on a second cell, wherein the second cell and the first cell are associated with a PUCCH group. The one or more second PUCCH resources may be associated with one or more second UL BWPs of the second cell (e.g., the UE may be configured with the one or more second PUCCH resources on the one or more second UL BWPs of the second cell). In some examples, the UE is configured with the one or more second PUCCH resources via reception of a signal/channel comprising a configuration of the one or more second PUCCH resources. In step 1415, the UE determines a first set of occasions associated with the first cell and a second set of occasions associated with the second cell, wherein the first set of occasions and the second set of occasions are associated with a first slot. In step 1420, the UE transmits a UL signal/channel, comprising PUCCH or PUSCH, in the first slot and in the second cell, wherein the UL signal/channel comprises a HARQ codebook and/or wherein the HARQ codebook comprises HARQ information associated with the first set of occasions and the second set of occasions. In some examples, the HARQ codebook comprises HARQ information associated with one or more other occasions (in addition to the HARQ information associated with the first set of occasions and the second set of occasions).

In the present disclosure, the term "signal/channel" may correspond to a signal and/or a channel.

In one embodiment, the UE is configured with a third cell, wherein the third cell is associated with the PUCCH group.

In one embodiment, the UE determines a third set of occasions associated with the third cell, wherein the third set of occasions is associated with the first slot.

In one embodiment, the HARQ codebook comprises HARQ information associated with the third set of occasions.

In one embodiment, the UE may change an active UL BWP of the first cell. A second slot in the first cell may be the earliest slot in which the UE may transmit on a new active UL BWP of the first cell (e.g., the UE may change the active UL BWP of the first cell from a previous active UL BWP of the first cell to the new active UL BWP of the first cell, wherein the one or more first UL BWPs may comprise the previous active UL BWP and/or the new active UL BWP). The UE may change the active UL BWP from a first UL BWP (e.g., the previous active UL BWP) to a second UL BWP (e.g., the new active UL BWP). In some examples, the UE is not required to transmit in the first cell until the second slot. The UE may receive and/or detect a DCI format (e.g., a DCI having the DCI format) indicating an active UL BWP change (e.g., the change from the first UL BWP to the second UL BWP) for the first cell. In some examples, the UE is not required to transmit, in the first cell, during a time duration. In some examples, the time duration comprises and/or starts at the beginning of a subframe for FR1. In some examples, the time duration comprises and/or starts at the beginning of half of a subframe for FR2. In some examples, the time duration, the subframe for FR1 and/or the subframe for FR2 may comprise and/or may start upon (and/or immediately after) a BWP inactivity timer expires. In some examples, the time duration, the subframe for FR1 and/or the subframe for FR2 may end at (e.g., may extend until) the beginning of a slot (e.g., the second slot) where the UE can receive and/or transmit (e.g., the slot may be the earlies slot in which the UE can receive and/or transmit on an new active UL BWP of the first cell).

In one embodiment, the UE does not change an active UL BWP of the second cell. In some examples, the active UL BWP of the second cell is not changed by the UE between a beginning of the second set of occasions (and/or a beginning of the first set of occasions) and transmission of the UL signal/channel in the second cell.

In one embodiment, the UE determines the first set of occasions, the second set of occasions, and/or the third set of occasions based on a set of timing values. Alternatively and/or additionally, the UE may determine the first set of occasions, the second set of occasions, and/or the third set of occasions based on a first set of slots, a second set of slots and/or a third set of slots, respectively. In some examples, the first set of slots, the second set of slots, and/or the third set of slots are determined based on the set of timing values (and/or a different set of timing values), such as a set of timing values $K_{1,k}$. In some examples, the first set of occasions, the second set of occasions, and/or the third set of occasions are earlier than the first slot. In some examples, the first set of slots, the second set of slots, and/or the third set of slots are earlier than the first slot.

In one embodiment, for each UL BWP of the first cell and/or each UL BWP of the second cell, the UE may be configured with a set of timing values, such as the same set of timing values.

In one embodiment, the first slot is $n_u$.

In one embodiment, the first set of slots corresponds to $\lfloor (n_U)-K_{1,k}) \cdot 2^{\mu_{DL}-\mu_{UL}} \rfloor + n_D$, wherein $K_{1,k}$ corresponds to one or more timing values of the set of timing values (e.g., the set of timing values $K_{1,k}$), $n_D=0, \ldots, \max(2^{\mu_{DL}-\mu_{UL}},1)-1$, $\mu_{DL}$ corresponds to a downlink SCS configuration of the first cell (e.g., a downlink SCS configuration of an active DL BWP of the first cell) and/or $\mu_{UL}$ corresponds to an uplink SCS configuration of the second cell (e.g., an uplink SCS configuration of the active UL BWP of the second cell).

In one embodiment, the second set of slots corresponds to $\lfloor (n_U)-K_{1,k}) \cdot 2^{\mu_{DL}-\mu_{UL}} \rfloor + n_D$, wherein $K_{1,k}$ corresponds to one or more timing values of the set of timing values (e.g., the set of timing values $K_{1,k}$), $n_D=a, \ldots, \max(2^{\mu_{DL}-\mu_{UL}},1)-1$, $\mu_{DL}$ corresponds to a downlink SCS configuration of the second cell (e.g., a downlink SCS configuration of an active DL BWP of the second cell) and/or $\mu_{UL}$ corresponds to an uplink SCS configuration of the second cell (e.g., an uplink SCS configuration of the active UL BWP of the second cell).

In one embodiment, the third set of slots corresponds to $\lfloor (n_U)-K_{1,k}) \cdot 2^{\mu_{DL}-\mu_{UL}} \rfloor + n_D$, wherein $K_{1,k}$ corresponds to one or more timing values of the set of timing values (e.g., the set of timing values $K_{1,k}$), $n_D=0, \ldots, \max(2^{\mu_{DL}-\mu_{UL}},1)-1$, $\mu_{DL}$ corresponds to a downlink SCS configuration of the third cell (e.g., a downlink SCS configuration of an active DL BWP of the third cell) and $\mu_{UL}$ corresponds to an uplink SCS configuration of the second cell (e.g., an uplink SCS configuration of the active UL BWP of the second cell).

In one embodiment, for SCS being 15, 30, 60, 120, 240, 480, 960 kHz, SCS configuration may be 0, 1, 2, 3, 4, 5, 6, respectively. For example, a SCS configuration (e.g., an uplink SCS configuration $\mu_{UL}$ and/or a downlink SCS configuration $\mu_{DL}$) being 0 may correspond to a SCS (e.g., an uplink SCS and/or a downlink SCS) of a cell being 15 kHz.

In one embodiment, if Condition E is met [Condition E is met if: (i) a slot (e.g., one slot) of the first set of slots is before an active DL BWP change on the first cell and/or an active UL BWP change on the second cell; and (ii) the first slot starts at a same time as or after an active DL BWP change on the first cell and/or an active UL BWP change on the second cell], the UE does not include one or more occasions, associated with the slot (e.g., the one slot), in the first set of occasions.

In one embodiment, if Condition F is met [Condition F is met if: (i) a slot (e.g., one slot, such as the second slot) of the first set of slots is before an active UL BWP change on the first cell, and/or (ii) the transmission (e.g., PUCCH transmission), such as the transmission of the UL signal/channel comprising the HARQ codebook is on the second cell], the UE may include one or more occasions, associated with the slot (e.g., the one slot, such as the second slot), in the first set of occasions.

In one embodiment, based on (e.g., in response to) there being no active UL BWP change on the second cell, the UE may include one or more occasions, associated with the slot (e.g., the one slot), in the first set of occasions.

In one embodiment, based on (e.g., in response to) a transmission (e.g., PUCCH transmission, such as the transmission of the UL signal/channel comprising the HARQ codebook) in the second cell (and based on there being no active UL BWP change on the second cell, for example), the UE may include one or more occasions, associated with the slot (e.g., the one slot), in the first set of occasions (e.g., the UE may include the one or more occasions, associated with the slot, in the first set of occasions based on a determination that the transmission is to be performed in the second cell).

In one embodiment, based on (e.g., in response to) the slot (e.g., the one slot) of the first set of slots being before an active DL BWP change on the first cell, the UE may not include one or more occasions, associated with the slot (e.g., the one slot), in the first set of occasions.

In one embodiment, for the slot (e.g., the one slot) of the first set of slots, the UE including one or more occasions, associated with the slot (e.g., the one slot), in the first set of occasions comprises the UE including one or more indexes of the one or more occasions, associated with the slot (e.g., the one slot), in the first set of occasions. Alternatively and/or additionally, in a scenario in which the UE includes one or more occasions, associated with the slot (e.g., the one slot), in the first set of occasions, the UE may include one or more indexes of the one or more occasions in the first set of occasions.

In one embodiment, for the slot (e.g., the one slot) of the first set of slots, the UE not including one or more occasions, associated with the slot (e.g., the one slot), in the first set of occasions comprises the UE increasing a DL slot index of the slot (e.g., the one slot) by one (e.g., $n_D=n_D+1$) and/or UE checking (and/or continuing to check) for a next DL slot (in the first set of slots, for example). Alternatively and/or additionally, in a scenario in which the UE does not include one or more occasions, associated with the slot (e.g., the one slot), in the first set of occasions, the UE may increase a DL slot index of the slot (e.g., the one slot) by one (e.g., $n_D=n_D+1$) and/or may check (and/or may continue to check) for a next DL slot (in the first set of slots).

In one embodiment, the first set of occasions corresponds to $M_{A,c}$ for the first cell.

In one embodiment, if Condition G is met [Condition G is met if: (i) a slot (e.g., one slot) of the second set of slots is before an active DL BWP change on the second cell and/or an active UL BWP change on the second cell; and (ii) the first slot starts at a same time as or after an active DL BWP change on the second cell and/or an active UL BWP change on the second cell], the UE does not include one or more occasions, associated with the slot (e.g., the one slot), in the second set of occasions.

In one embodiment, if Condition H is met [Condition H is met if: (i) a slot (e.g., one slot, such as the second slot) of the second set of slots is before an active UL BWP change on the first cell, and/or (ii) the transmission (e.g., PUCCH transmission), such as the transmission of the UL signal/channel comprising the HARQ codebook is on the second cell], the UE may include one or more occasions, associated with the slot (e.g., the one slot, such as the second slot), in the second set of occasions.

In one embodiment, based on (e.g., in response to) there being no active UL BWP change on the second cell, the UE may include one or more occasions, associated with the slot (e.g., the one slot), in the second set of occasions.

In one embodiment, based on (e.g., in response to) a transmission (e.g., PUCCH transmission, such as the transmission of the UL signal/channel comprising the HARQ codebook) in the second cell (and based on there being no active UL BWP change on the second cell, for example), the UE may include one or more occasions, associated with the slot (e.g., the one slot), in the second set of occasions (e.g., the UE may include the one or more occasions, associated with the slot, in the second set of occasions based on a determination that the transmission is to be performed in the second cell).

In one embodiment, based on (e.g., in response to) the slot (e.g., the one slot) of the second set of slots being before an active DL BWP change on the second cell, the UE may not include one or more occasions, associated with the slot (e.g., the one slot), in the second set of occasions.

In one embodiment, for the slot (e.g., the one slot) of the second set of slots, the UE including one or more occasions, associated with the slot (e.g., the one slot), in the second set of occasions comprises the UE including one or more indexes of the one or more occasions, associated with the slot (e.g., the one slot), in the second set of occasions. Alternatively and/or additionally, in a scenario in which the UE includes one or more occasions, associated with the slot (e.g., the one slot), in the second set of occasions, the UE may include one or more indexes of the one or more occasions in the second set of occasions.

In one embodiment, for the slot (e.g., the one slot) of the second set of slots, the UE not including one or more occasions, associated with the slot (e.g., the one slot), in the second set of occasions comprises the UE increasing a DL slot index of the slot (e.g., the one slot) by one (e.g., $n_D=n_D+1$) and/or UE checking (and/or continuing to check) for a next DL slot (in the second set of slots, for example). Alternatively and/or additionally, in a scenario in which the UE does not include one or more occasions, associated with the slot (e.g., the one slot), in the second set of occasions, the UE may increase a DL slot index of the slot (e.g., the one slot) by one (e.g., $n_D=n_D+1$) and/or may check (and/or may continue to check) for a next DL slot (in the second set of slots).

In one embodiment, the second set of occasions corresponds to $M_{A,c}$ for the second cell.

In one embodiment, if Condition I is met [Condition I is met if: (i) a slot (e.g., one slot) of the third set of slots is before an active DL BWP change on the third cell and/or an active UL BWP change on the second cell; and (ii) the first slot starts at a same time as or after an active DL BWP change on the third cell and/or an active UL BWP change on the second cell], the UE does not include one or more occasions, associated with the slot (e.g., the one slot), in the third set of occasions.

In one embodiment, if Condition J is met [Condition J is met if: (i) a slot (e.g., one slot, such as the second slot) of the third set of slots is before an active UL BWP change on the first cell, and/or (ii) the transmission (e.g., PUCCH transmission), such as the transmission of the UL signal/channel comprising the HARQ codebook is on the second cell], the UE may include one or more occasions, associated with the slot (e.g., the one slot, such as the second slot), in the third set of occasions.

In one embodiment, based on (e.g., in response to) there being no active UL BWP change on the second cell, the UE may include one or more occasions, associated with the slot (e.g., the one slot), in the third set of occasions.

In one embodiment, based on (e.g., in response to) a transmission (e.g., PUCCH transmission, such as the transmission of the UL signal/channel comprising the HARQ codebook) in the second cell (and based on there being no active UL BWP change on the second cell, for example), the UE may include one or more occasions, associated with the slot (e.g., the one slot), in the third set of occasions (e.g., the UE may include the one or more occasions, associated with the slot, in the third set of occasions based on a determination that the transmission is to be performed in the second cell).

In one embodiment, based on (e.g., in response to) the slot (e.g., the one slot) of the third set of slots being before an active DL BWP change on the third cell, the UE may not include one or more occasions, associated with the slot (e.g., the one slot), in the third set of occasions.

In one embodiment, for the slot (e.g., the one slot) of the third set of slots, the UE including one or more occasions, associated with the slot (e.g., the one slot), in the third set of occasions comprises the UE including one or more indexes of the one or more occasions, associated with the slot (e.g., the one slot), in the third set of occasions. Alternatively and/or additionally, in a scenario in which the UE includes one or more occasions, associated with the slot (e.g., the one slot), in the third set of occasions, the UE may include one or more indexes of the one or more occasions in the third set of occasions.

In one embodiment, for the slot (e.g., the one slot) of the third set of slots, the UE not including one or more occasions, associated with the slot (e.g., the one slot), in the third set of occasions comprises the UE increasing a DL slot index of the slot (e.g., the one slot) by one (e.g., $n_D=n_D+1$) and/or UE checking (and/or continuing to check) for a next DL slot (in the third set of slots, for example). Alternatively and/or additionally, in a scenario in which the UE does not include one or more occasions, associated with the slot (e.g., the one slot), in the third set of occasions, the UE may increase a DL slot index of the slot (e.g., the one slot) by one (e.g., $n_D=n_D+1$) and/or may check (and/or may continue to check) for a next DL slot (in the third set of slots).

In one embodiment, the third set of occasions corresponds to $M_{A,c}$ for the third cell.

In one embodiment, for a given slot, on a given cell, from a plurality of slots comprising the first set of slots, the second set of slots, or the third set of slots, wherein the given slot is before the second slot, based on (e.g., in response to) a transmission (e.g., PUCCH transmission, such as the transmission of the UL signal/channel comprising the HARQ codebook) in the second cell (and based on there being no active UL BWP change on the second cell, for example) and based on there being no active DL BWP change on the given cell after the given slot, the HARQ codebook comprises HARQ information that is in response to one or more occasions associated with the given slot on the given cell (e.g., the UE may include the HARQ information, that is in response to the one or more occasions, in the HARQ codebook based on a determination that the transmission is in the second cell, a determination that there is no active UL BWP change on the second cell and/or there being no active DL BWP change on the given cell after the given slot).

In one embodiment, for a given slot, on a given cell, from the plurality of slots, wherein the given slot is before the second slot, if the UE transmits (e.g., transmits the HARQ codebook) in the second cell (and if there is no active UL BWP change on the second cell, for example) and if there is no active DL BWP change on the given cell after the given slot, the HARQ codebook comprises HARQ information that is in response to one or more occasions associated with the given slot on the given cell (e.g., the UE may include the HARQ information, that is in response to the one or more occasions, in the HARQ codebook if the transmission is in the second cell, there is no active UL BWP change on the second cell and/or there is no active DL BWP change on the given cell after the given slot).

In one embodiment, for a given slot, on a given cell, from the plurality of slots, wherein the given slot is before the second slot, based on (e.g., in response to) a transmission (e.g., PUCCH transmission, such as the transmission of the UL signal/channel comprising the HARQ codebook) in the second cell (and based on there being no active UL BWP change on the second cell, for example) and based on there being an active DL BWP change on the given cell after the given slot, the HARQ codebook does not comprise HARQ information that is in response to one or more occasions associated with the given slot on the given cell (e.g., the UE may not include the HARQ information, that is in response to the one or more occasions, in the HARQ codebook based on a determination that the transmission is in the second cell, a determination that there is no active UL BWP change on the second cell and/or there being an active DL BWP change on the given cell after the given slot).

In one embodiment, for a given slot, on a given cell, from the plurality of slots, wherein the given slot is before the second slot, if the UE transmits (e.g., transmits the HARQ codebook) in the second cell (and if there is no active UL BWP change on the second cell, for example) and if there is an active DL BWP change on the given cell after the given slot, the HARQ codebook does not comprise HARQ information that is in response to one or more occasions associated with the given slot on the given cell (e.g., the UE may not include the HARQ information, that is in response to the one or more occasions, in the HARQ codebook if the transmission is in the second cell, there is no active UL BWP change on the second cell and/or there is an active DL BWP change on the given cell after the given slot).

In one embodiment, for a given slot, on a given cell, from the plurality of slots, wherein the given slot is before the second slot, based on (e.g., in response to) a transmission (e.g., PUCCH transmission, such as the transmission of the UL signal/channel comprising the HARQ codebook) in the first cell (and based on there being an active UL BWP change on the first cell, for example), the HARQ codebook does not comprise HARQ information that is in response to one or more occasions associated with the given slot on the given cell (e.g., the UE may not include the HARQ information, that is in response to the one or more occasions, in the HARQ codebook based on a determination that the transmission is in the first cell and/or a determination that there is an active UL BWP change on the first cell).

In one embodiment, for a given slot, on a given cell, from the plurality of slots, wherein the given slot is before the second slot, if the UE transmits (e.g., transmits the HARQ codebook) in the first cell (and if there is an active UL BWP change on the first cell, for example), the HARQ codebook does not comprise HARQ information that is in response to one or more occasions associated with the given slot on the given cell (e.g., the UE may not include the HARQ information, that is in response to the one or more occasions, in the HARQ codebook if the transmission is in the first cell and/or there is an active UL BWP change on the first cell).

In one embodiment, for a given slot, on a given cell, from the plurality of slots, wherein the given slot is before the second slot, based on (e.g., in response to) a transmission (e.g., PUCCH transmission, such as the transmission of the UL signal/channel comprising the HARQ codebook) in the first cell (and based on there being an active UL BWP change on the first cell, for example), the HARQ codebook does not comprise one or more locations (e.g., one or more locations for placing and/or setting HARQ information) associated with the given slot on the given cell.

In one embodiment, for a given slot, on a given cell, from the plurality of slots, wherein the given slot is before the second slot, based on (e.g., in response to) a transmission (e.g., PUCCH transmission, such as the transmission of the UL signal/channel comprising the HARQ codebook) in the second cell (and based on there being no active UL BWP change on the second cell, for example) and based on there being no active DL BWP change on the given cell after the given slot, the HARQ codebook comprises one or more occasions associated with the given slot on the given cell.

In one embodiment, for a given slot, on a given cell, from the plurality of slots, wherein the given slot is before the second slot, if the UE transmits (e.g., transmits the HARQ codebook) in the second cell (and if there is no active UL BWP change on the second cell, for example) and if there is no active DL BWP change on the given cell after the given slot, the HARQ codebook comprises one or more occasions associated with the given slot on the given cell.

In one embodiment, for a given slot, on a given cell, from the plurality of slots, wherein the given slot is before the second slot, based on (e.g., in response to) a transmission (e.g., PUCCH transmission, such as the transmission of the UL signal/channel comprising the HARQ codebook) in the second cell (and based on there being no active UL BWP change on the second cell, for example) and based on there being an active DL BWP change on the given cell after the given slot, the HARQ codebook does not comprise one or more occasions associated with the given slot on the given cell.

In one embodiment, for a given slot, on a given cell, from the plurality of slots, wherein the given slot is before the second slot, if the UE transmits (e.g., transmits the HARQ codebook) in the second cell (and if there is no active UL BWP change on the second cell, for example) and based on there being an active DL BWP change on the given cell after the given slot, the HARQ codebook does not comprise one or more occasions associated with the given slot on the given cell.

In one embodiment, for a given slot, on a given cell, from the plurality of slots, wherein the given slot is before the second slot, based on (e.g., in response to) a transmission (e.g., PUCCH transmission, such as the transmission of the UL signal/channel comprising the HARQ codebook) in the first cell (and based on there being an active UL BWP change on the first cell, for example), the HARQ codebook does not comprise one or more occasions associated with the given slot on the given cell.

In one embodiment, for a given slot, on a given cell, from the plurality of slots, wherein the given slot is before the second slot, if the UE transmits (e.g., transmits the HARQ codebook) in the first cell (and if there is an active UL BWP change on the first cell, for example), the HARQ codebook does not comprise one or more occasions associated with the given slot on the given cell.

In one embodiment, for a given slot, on a given cell, from the plurality of slots, wherein the given slot is before the second slot, based on (e.g., in response to) a transmission (e.g., PUCCH transmission, such as the transmission of the UL signal/channel comprising the HARQ codebook) in the second cell (and based on there being no active UL BWP change on the second cell, for example) and based on there being no active DL BWP change on the given cell after the given slot, the HARQ codebook comprises one or more locations (e.g., one or more locations for placing and/or setting HARQ information) associated with the given slot on the given cell.

In one embodiment, for a given slot, on a given cell, from the plurality of slots, wherein the given slot is before the second slot, if the UE transmits (e.g., transmits the HARQ codebook) in the second cell (and if there is no active UL BWP change on the second cell, for example) and if there is no active DL BWP change on the given cell after the given slot, the HARQ codebook comprises one or more locations (e.g., one or more locations for placing and/or setting HARQ information) associated with the given slot on the given cell.

In one embodiment, for a given slot, on a given cell, from the plurality of slots, wherein the given slot is before the second slot, based on (e.g., in response to) a transmission (e.g., PUCCH transmission, such as the transmission of the UL signal/channel comprising the HARQ codebook) in the second cell (and based on there being no active UL BWP change on the second cell, for example) and based on there being an active DL BWP change on the given cell after the given slot, the HARQ codebook does not comprise one or more locations (e.g., one or more locations for placing and/or setting HARQ information) associated with the given slot on the given cell.

In one embodiment, for a given slot, on a given cell, from the plurality of slots, wherein the given slot is before the second slot, if the UE transmits (e.g., transmits the HARQ codebook) in the second cell (and if there is no active UL BWP change on the second cell, for example) and based on there being an active DL BWP change on the given cell after the given slot, the HARQ codebook does not comprise one or more locations (e.g., one or more locations for placing and/or setting HARQ information) associated with the given slot on the given cell.

In one embodiment, for a given slot, on a given cell, from the plurality of slots, wherein the given slot is before the second slot, based on (e.g., in response to) a transmission (e.g., PUCCH transmission, such as the transmission of the UL signal/channel comprising the HARQ codebook) in the first cell (and based on there being an active UL BWP change on the first cell, for example), the HARQ codebook does not comprise one or more locations (e.g., one or more locations for placing and/or setting HARQ information) associated with the given slot on the given cell.

In one embodiment, for a given slot, on a given cell, from the plurality of slots, wherein the given slot is before the second slot, if the UE transmits (e.g., transmits the HARQ codebook) in the first cell (and if there is an active UL BWP change on the first cell, for example), the HARQ codebook does not comprise one or more locations (e.g., one or more locations for placing and/or setting HARQ information) associated with the given slot on the given cell.

In one embodiment, the UE determines the first set of occasions for one or more candidate PDSCH receptions in the first cell, one or more SPS PDSCH releases in the first cell and/or one or more beam indications (e.g., one or more beam indications without downlink assignment) in the first cell (and/or the UE may determine one or more occasions of the first set of occasions for other receptions, transmissions, indications and/or events in addition to the one or more candidate PDSCH receptions, the one or more SPS PDSCH releases and/or the one or more beam indications). Alternatively and/or additionally, the UE may determine the second set of occasions for one or more candidate PDSCH receptions in the second cell, one or more SPS PDSCH releases in the second cell and/or one or more beam indications (e.g., one or more beam indications without downlink assignment) in the second cell (and/or the UE may determine one or more occasions of the second set of occasions for other receptions, transmissions, indications and/or events in addition to the one or more candidate PDSCH receptions, the one or more SPS PDSCH releases and/or the one or more beam indications). Alternatively and/or additionally, the UE may determine the third set of occasions for one or more candidate PDSCH receptions in the third cell, one or more SPS PDSCH releases in the third cell and/or one or more beam indications (e.g., one or more beam indications without downlink assignment) in the third cell (and/or the UE may determine one or more occasions of the third set of occasions for other receptions, transmissions, indications and/or events in addition to the one or more candidate PDSCH receptions, the one or more SPS PDSCH releases and/or the one or more beam indications).

In one embodiment, the UE determines that the first set of occasions is associated with the first slot based on information, indicated by a DCI, for deriving the first slot. For example, the information indicated by the DCI may be used to determine the first slot (e.g., the first slot may be determined based on the information indicated by the DCI). In some examples, the information may be indicative of a timing value of a set of timing values $K_{1,k}$ (e.g., the first slot may be determined based on the timing value, of the set of timing values $K_{1,k}$, indicated by the information). In some examples, the information indicated by the DCI may indicate that the first set of occasions is associated with the first slot (e.g., the associations between the first slot and the first set of occasions are based on and/or indicated by the information indicated by the DCI). In some examples, the first set of occasions being associated with the first slot corresponds to the DCI being indicative of the information for deriving the first slot (e.g., the DCI being indicative of the timing value of the set of timing values $K_{1,k}$). In some examples, the DCI may schedule one or more downlink assignments on an occasion (e.g., one occasion) of the first set of occasions (and/or may schedule one or more other assignments in addition to the one or more downlink assignments on the occasion of the first set of occasions).

In one embodiment, the UE determines that the second set of occasions is associated with the first slot based on information, indicated by a DCI, for deriving the first slot. For example, the information indicated by the DCI may be used to determine the first slot (e.g., the first slot may be determined based on the information indicated by the DCI). In some examples, the information may be indicative of a timing value of a set of timing values $K_{1,k}$ (e.g., the first slot may be determined based on the timing value, of the set of timing values $K_{1,k}$, indicated by the information). In some examples, the information indicated by the DCI may indicate that the second set of occasions is associated with the first slot (e.g., the associations between the first slot and the second set of occasions are based on and/or indicated by the information indicated by the DCI). In some examples, the second set of occasions being associated with the first slot corresponds to the DCI being indicative of the information for deriving the first slot (e.g., the DCI being indicative of the timing value of the set of timing values $K_{1,k}$). In some examples, the DCI may schedule one or more downlink assignments on an occasion (e.g., one occasion) of the second set of occasions (and/or may schedule one or more other assignments in addition to the one or more downlink assignments on the occasion of the second set of occasions).

In one embodiment, the UE determines that the third set of occasions is associated with the first slot based on information, indicated by a DCI, for deriving the first slot. For example, the information indicated by the DCI may be used to determine the first slot (e.g., the first slot may be determined based on the information indicated by the DCI). In some examples, the information may be indicative of a timing value of a set of timing values $K_{1,k}$ (e.g., the first slot may be determined based on the timing value, of the set of timing values $K_{1,k}$, indicated by the information). In some examples, the information indicated by the DCI may indicate that the third set of occasions is associated with the first slot (e.g., the associations between the first slot and the third set of occasions are based on and/or indicated by the information indicated by the DCI). In some examples, the third set of occasions being associated with the first slot corresponds to the DCI being indicative of the information for deriving the first slot (e.g., the DCI being indicative of the timing value of the set of timing values $K_{1,k}$). In some examples, the DCI may schedule one or more downlink assignments on an occasion (e.g., one occasion) of the third set of occasions (and/or may schedule one or more other assignments in addition to the one or more downlink assignments on the occasion of the third set of occasions).

In one embodiment, the UE is configured with PUCCH carrier switch, and/or the UE has capability for PUCCH carrier switch.

In one embodiment, the HARQ codebook is a type-1 HARQ codebook (e.g., type-1 HARQ-ACK codebook).

In one embodiment, a size of the HARQ codebook is determined based on a measure of occasions of the first set of occasions, a measure of occasions of the second set of occasions, and a measure of occasions of the third set of occasions (and/or based on data in addition to the measure of occasions of the first set of occasions, the measure of occasions of the second set of occasions, and the measure of occasions of the third set of occasions). The measure of occasions of the first set of occasions may correspond to a size of the first set of occasions and/or a quantity of occasions of the first set of occasions. The measure of occasions of the second set of occasions may correspond to a size of the second set of occasions and/or a quantity of occasions of the second set of occasions. The measure of occasions of the third set of occasions may correspond to a size of the third set of occasions and/or a quantity of occasions of the third set of occasions. In some examples, the measure of occasions of the first set of occasions, the measure of occasions of the second set of occasions, and the measure of occasions of the third set of occasions are combined (e.g., summed) to determine the size of the HARQ codebook. For example, the size of the HARQ codebook may be determined based on the sum of the measure of occasions of the first set of occasions, the measure of occasions of the second set of occasions, and the measure of occasions of the third set of occasions (and/or based on data in addition to the sum).

In one embodiment, the HARQ codebook has a plurality of locations (e.g., the HARQ codebook comprises the plurality of locations and/or the plurality of locations are within the HARQ codebook).

In one embodiment, a location within the HARQ codebook (e.g., a location of the plurality of locations) corresponds to HARQ information (e.g., the HARQ information may be associated with an occasion).

In some examples, a location within the HARQ codebook (e.g., a location of the plurality of locations) is associated with an occasion (e.g., one occasion) of a plurality of occasions comprising the first set of occasions, the second set of occasions and the third set of occasions. For example, the HARQ codebook may comprise HARQ information, associated with the occasion, at the location. In some examples, the HARQ information may be indicative of whether or not a signal/channel (e.g., a PDSCH reception, a SPS PDSCH release and/or a beam indication) is successfully detected and/or received.

In one embodiment, if a set of occasions (e.g., the first set of occasions, the second set of occasions, or the third set of occasions) is empty (e.g., no occasion in the set of occasions) there is no location associated with the empty set (e.g., the plurality of locations may not comprise a location associated with the empty set).

In one embodiment, one or more associations between one or more locations within the HARQ codebook and one or more occasions of a plurality of occasions (e.g., a plurality of occasions comprising the first set of occasions, the second set of occasions and the third set of occasions) is based on one or more cell indexes (e.g., ascending cell index) associated with the one or more occasions (e.g., a cell index associated with an occasion may correspond to a cell index of a cell associated with the occasion), and one or more occasion indexes of the one or more occasions. In some examples, an occasion index (of the one or more occasion indexes) of an occasion in the first set of occasions may correspond an index of the occasion in the first set of occasions, an occasion index (of the one or more occasion indexes) of an occasion in the second set of occasions may correspond to an index of the occasion in the second set of occasions and/or an occasion index (of the one or more occasion indexes) of an occasion in the third set of occasions may correspond to an index of the occasion in the third set of occasions). In some examples, occasion indexes of occasions in a set of occasions (e.g., the first set of occasions, the second set of occasions, or the third set of occasions) are indexed in an ascending order according to timings of the occasions. In some examples, a beginning (e.g., initial) location within the HARQ codebook corresponds to an occasion, of a set of occasions associated with a cell with a lowest cell index (e.g., lowest cell index among the first cell, the second cell and the third cell), wherein among the set of occasions, the occasion corresponding to the beginning location may have the smallest occasion index, wherein the set of occasions may be the first set of occasions associated with the first cell, the second set of occasions associated with the second cell, or the third set of occasions associated with the third cell. The set of occasions may be a non-empty set of occasions. A location following the beginning location (e.g., a second location that directly follows the beginning location) may correspond to a second occasion, of the set of occasions associated with the cell with the lowest cell index, that has a second-smallest occasion index among the set of occasions.

Referring back to FIGS. 3 and 4, in one exemplary embodiment of a UE in a wireless communication system, the device 300 includes a program code 312 stored in the memory 310. The CPU 308 may execute program code 312 to enable the UE (i) to be configured with one or more first PUCCH resources on a first cell, (ii) to be configured with one or more second PUCCH resources on a second cell, wherein the second cell and the first cell are associated with a PUCCH group, (iii) to determine a first set of occasions associated with the first cell and a second set of occasions associated with the second cell, wherein the first set of occasions and the second set of occasions are associated with a first slot, and (iv) to transmit a UL signal/channel, comprising PUCCH or PUSCH, in the first slot and in the second cell, wherein the UL signal/channel comprises a HARQ codebook and/or wherein the HARQ codebook comprises HARQ information associated with the first set of occasions and the second set of occasions. Furthermore, the CPU 308 can execute the program code 312 to perform one, some and/or all of the above-described actions and steps and/or others described herein.

Figure 15:
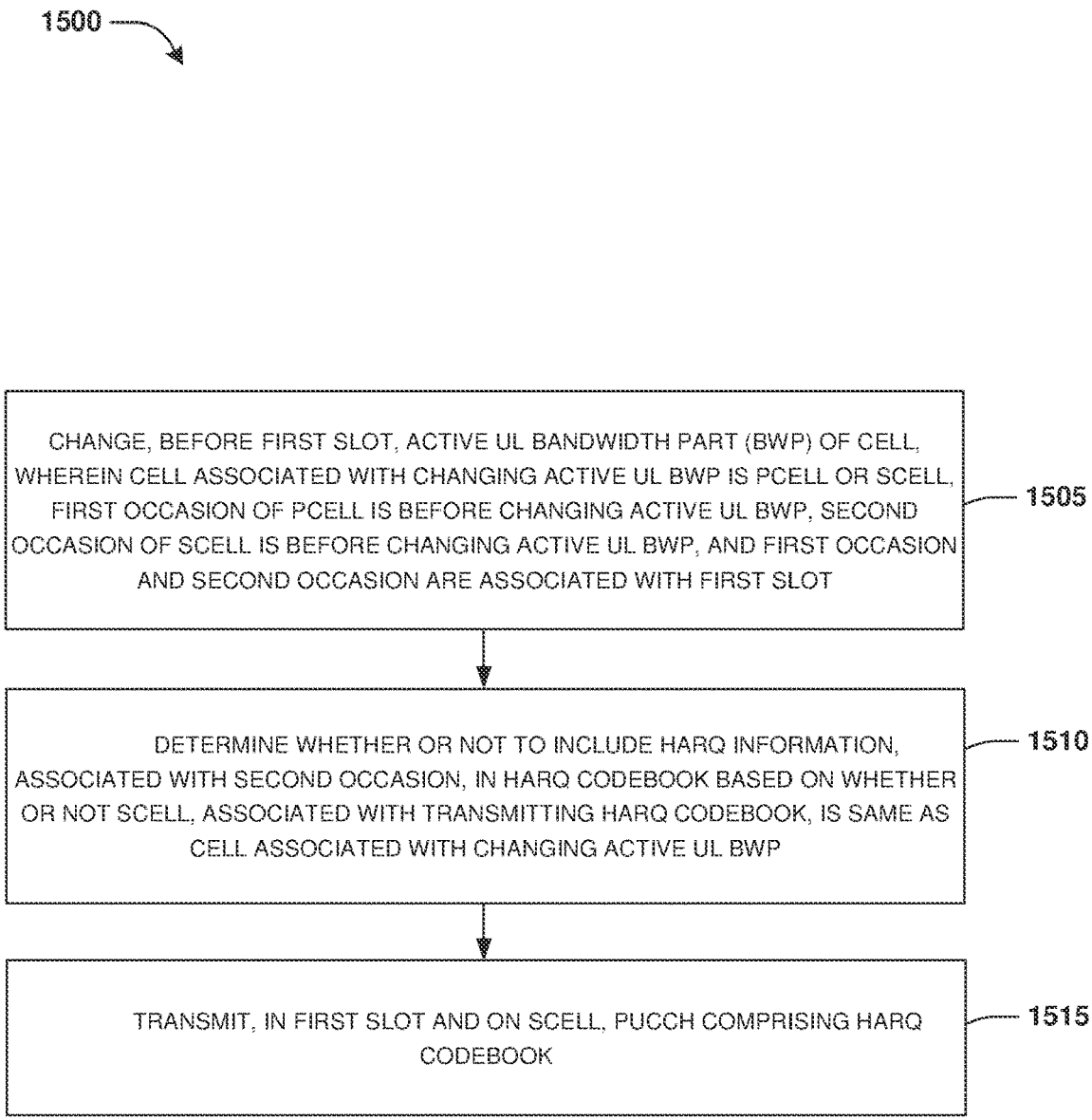
FIG. 15 is a flow chart according to one exemplary embodiment.

FIG. 15 is a flow chart 1500 according to one exemplary embodiment from the perspective of a UE in a wireless communication system. The UE is configured with one or more first PUCCH resources on a PCell and configured with one or more second PUCCH resources on a SCell. The PCell and the SCell are associated with a PUCCH group (e.g., the same PUCCH group). For example, the PCell and/or the SCell may be part of the PUCCH group. Alternatively and/or additionally, the one or more first PUCCH resources (on the PCell) and/or the one or more second PUCCH resources (on the SCell) may be part of the PUCCH group. In some examples, the one or more first PUCCH resources may be on one or more first UL BWPs on the PCell. In some examples, the one or more second PUCCH resources may be on one or more second UL BWPs on the SCell. In some examples, the SCell comprises a PUCCH-switching secondary cell (PUCCH-sSCell). In some examples, the UE is configured with the one or more first PUCCH resources (on the PCell) via reception of a signal/channel comprising a configuration of the one or more first PUCCH resources. In some examples, the UE is configured with the one or more second PUCCH resources (on the SCell) via reception of a signal/channel comprising a configuration of the one or more second PUCCH resources. In step 1505, the UE changes an active UL BWP of a cell before a first slot. The cell associated with the active UL BWP change (e.g., the cell for which the active UL BWP is changed) is the PCell or the SCell. A first occasion of the PCell is before the active UL BWP change. A second occasion of the SCell is before the active UL BWP change. The first occasion and the second occasion are associated with the first slot. In step 1510, the UE determines whether or not to include HARQ information, associated with the second occasion, in a HARQ codebook based on whether or not a cell to be used for transmitting the HARQ codebook is the same as the cell associated with the active UL BWP change. The cell to be used for transmitting the HARQ codebook may be the SCell. For example, the SCell is associated with (e.g., used for) transmitting the HARQ codebook. In step 1515, the UE transmits a PUCCH, comprising the HARQ codebook, in the first slot and on the SCell.

In one embodiment, based on (e.g., in response to) a determination that the SCell associated with transmitting the PUCCH is the same as the cell associated with the active UL BWP change, the UE does not include HARQ information, associated with the first occasion and the second occasion, in the HARQ codebook. For example, based on (e.g., in response to) the determination that the SCell associated with transmitting the PUCCH is the same as the cell associated with the active UL BWP change, the UE may generate the HARQ codebook such that HARQ information associated with the first occasion and HARQ information associated with the second occasion are not included in the HARQ codebook. Alternatively and/or additionally, based on (e.g., in response to) the determination that the SCell associated with transmitting the PUCCH is the same as the cell associated with the active UL BWP change, the HARQ codebook may not comprise the first occasion (and/or may not comprise HARQ information associated with the first occasion) and may not comprise the second occasion (and/or may not comprise HARQ information associated with the second occasion).

In one embodiment, based on (e.g., in response to) a determination that the SCell associated with transmitting the PUCCH is different than the cell associated with the active UL BWP change, the UE includes HARQ information, associated with the second occasion, in the HARQ codebook and does not include HARQ information, associated with the first occasion, in the HARQ codebook. For example, based on (e.g., in response to) the determination that the SCell associated with transmitting the PUCCH is different than the cell associated with the active UL BWP change, the UE may generate the HARQ codebook such that HARQ information associated with the second occasion is included in the HARQ codebook and HARQ information associated with the first occasion is not included in the HARQ codebook. Alternatively and/or additionally, based on (e.g., in response to) the determination that the SCell associated with transmitting the PUCCH is different than the cell associated with the active UL BWP change, the HARQ codebook may comprise the second occasion (and/or may comprise HARQ information associated with the second occasion) and may not comprise the first occasion (and/or may not comprise HARQ information associated with the first occasion).

In one embodiment, the UE is configured with a third cell without being configured with PUCCH resources in the PUCCH group. The third cell is an another SCell. A third occasion of the third cell is associated with the first slot. The third occasion is before the active UL BWP change (e.g., the third occasion is before the UE changes the active UL BWP of the SCell).

In one embodiment, based on (e.g., in response to) a determination that the SCell associated with transmitting the PUCCH is the same as the cell associated with the active UL BWP change, the UE does not include HARQ information, associated with the third occasion, in the HARQ codebook. For example, based on (e.g., in response to) the determination that the SCell associated with transmitting the PUCCH is the same as the cell associated with the active UL BWP change, the UE may generate the HARQ codebook such that HARQ information associated with the third occasion is not included in the HARQ codebook. Alternatively and/or additionally, based on (e.g., in response to) the determination that the SCell associated with transmitting the PUCCH is the same as the cell associated with the active UL BWP change, the HARQ codebook may not comprise the third occasion (and/or may not comprise HARQ information associated with the third occasion).

In one embodiment, based on (e.g., in response to) a determination that the SCell associated with transmitting the PUCCH is different than the cell associated with the active UL BWP change, the UE includes HARQ information, associated with the third occasion, in the HARQ codebook. For example, based on (e.g., in response to) the determination that the SCell associated with transmitting the PUCCH is different than the cell associated with the active UL BWP change, the UE may generate the HARQ codebook such that HARQ information associated with the third occasion is included in the HARQ codebook. Alternatively and/or additionally, based on (e.g., in response to) the determination that the SCell associated with transmitting the PUCCH is different than the cell associated with the active UL BWP change, the HARQ codebook may comprise the third occasion (and/or may comprise HARQ information associated with the third occasion).

In one embodiment, the first occasion is associated with (e.g., the first occasion is for) one or more candidate PDSCH receptions in the PCell, one or more SPS PDSCH releases in the PCell, and/or one or more beam indications in the PCell. The second occasion is associated with (e.g., the second occasion is for) one or more candidate PDSCH receptions in the SCell, one or more SPS PDSCH releases in the SCell, and/or one or more beam indications in the SCell. The third occasion is associated with (e.g., the third occasion is for) one or more candidate PDSCH receptions in the third cell, one or more SPS PDSCH releases in the third cell, and/or one or more beam indications in the third cell.

In one embodiment, the UE determines that the first occasion, the second occasion and the third occasion are associated with the first slot based on information, indicated by one or more DCIs, for deriving the first slot. For example, the information indicated by the one or more DCIs may be used to determine the first slot (e.g., the first slot may be determined based on the information indicated by the one or more DCIs). In some examples, the information may be indicative of a timing value of a set of timing values $K_{1,k}$ (e.g., the first slot may be determined based on the timing value, of the set of timing values $K_{1,k}$, indicated by the information). In some examples, the information indicated by the one or more DCIs may indicate that the first occasion, the second occasion and the third occasion are associated with the first slot (e.g., the associations between the first slot and the first occasion, the second occasion and the third occasion are based on and/or indicated by the information indicated by the one or more DCIs). In some examples, the first occasion, the second occasion and the third occasion being associated with the first slot corresponds to the one or more DCIs being indicative of the information for deriving the first slot (e.g., the one or more DCIs being indicative of the timing value of the set of timing values $K_{1,k}$). In some examples, the one or more DCIs may schedule one or more downlink assignments on the first occasion, the second occasion and/or the third occasion.

In one embodiment, a size of the HARQ codebook is determined based on a measure of occasions of a first set of occasions, a measure of occasions of a second set of occasions, and a measure of occasions of a third set of occasions (and/or based on data in addition to the measure of occasions of the first set of occasions, the measure of occasions of the second set of occasions, and the measure of occasions of the third set of occasions). The measure of occasions of the first set of occasions may correspond to a size of the first set of occasions and/or a quantity of occasions of the first set of occasions. The measure of occasions of the second set of occasions may correspond to a size of the second set of occasions and/or a quantity of occasions of the second set of occasions. The measure of occasions of the third set of occasions may correspond to a size of the third set of occasions and/or a quantity of occasions of the third set of occasions. In some examples, the measure of occasions of the first set of occasions, the measure of occasions of the second set of occasions, and the measure of occasions of the third set of occasions are combined (e.g., summed) to determine the size of the HARQ codebook. For example, the size of the HARQ codebook may be determined based on the sum of the measure of occasions of the first set of occasions, the measure of occasions of the second set of occasions, and the measure of occasions of the third set of occasions (and/or based on data in addition to the sum).

In one embodiment, the first set of occasions comprises one or more occasions, associated with the first slot, on the PCell.

In one embodiment, the second set of occasions comprises one or more occasions, associated with the first slot, on the SCell.

In one embodiment, the third set of occasions comprises one or more occasions, associated with the first slot, on the third cell.

In one embodiment, whether or not the first set of occasions comprises the first occasion is determined (by the UE) based on whether or not the SCell associated with transmitting the PUCCH is the same as the cell associated with the active UL BWP change. In some examples, the first set of occasions may not comprise the first occasion based on the SCell associated with transmitting the PUCCH being the same as the cell associated with the active UL BWP change. In some examples, the first set of occasions may comprise the first occasion based on the SCell associated with transmitting the PUCCH being different than the cell associated with the active UL BWP change.

In one embodiment, whether or not the second set of occasions comprises the second occasion is determined (by the UE) based on whether or not the SCell associated with transmitting the PUCCH is the same as the cell associated with the active UL BWP change. In some examples, the second set of occasions may not comprise the second occasion based on the SCell associated with transmitting the PUCCH being the same as the cell associated with the active UL BWP change. In some examples, the second set of occasions may comprise the second occasion based on the SCell associated with transmitting the PUCCH being different than the cell associated with the active UL BWP change.

In one embodiment, whether or not the third set of occasions comprises the third occasion is determined (by the UE) based on whether or not the SCell associated with transmitting the PUCCH is the same as the cell associated with the active UL BWP change. In some examples, the third set of occasions may not comprise the third occasion based on the SCell associated with transmitting the PUCCH being the same as the cell associated with the active UL BWP change. In some examples, the third set of occasions may comprise the third occasion based on the SCell associated with transmitting the PUCCH being different than the cell associated with the active UL BWP change.

In one embodiment, the HARQ codebook has a plurality of locations (e.g., the HARQ codebook comprises the plurality of locations and/or the plurality of locations are within the HARQ codebook).

In one embodiment, a location within the HARQ codebook (e.g., a location of the plurality of locations) corresponds to HARQ information (e.g., the HARQ information may be associated with an occasion).

In some examples, a location within the HARQ codebook (e.g., a location of the plurality of locations) is associated with an occasion (e.g., one occasion) of a plurality of occasions comprising the first set of occasions, the second set of occasions and the third set of occasions. For example, the HARQ codebook may comprise HARQ information, associated with the occasion, at the location. In some examples, the HARQ information may be indicative of whether or not a signal/channel (e.g., a PDSCH reception, a SPS PDSCH release and/or a beam indication) is successfully detected and/or received.

Referring back to FIGS. 3 and 4, in one exemplary embodiment of a UE in a wireless communication system, the device 300 includes a program code 312 stored in the memory 310. The UE is configured with one or more first PUCCH resources on a PCell and configured with one or more second PUCCH resources on a SCell. The PCell and the SCell are associated with a PUCCH group (e.g., the same PUCCH group). For example, the PCell and/or the SCell may be part of the PUCCH group. Alternatively and/or additionally, the one or more first PUCCH resources (on the PCell) resources and/or the one or more second PUCCH resources (on the SCell) may be part of the PUCCH group. In some examples, the one or more first PUCCH resources may be on one or more first UL BWPs on the PCell. In some examples, the one or more second PUCCH resources may be on one or more second UL BWPs on the SCell. In some examples, the SCell comprises a PUCCH-sSCell. The CPU 308 may execute program code 312 to enable the UE (i) to change, before a first slot, an active UL BWP of a cell, wherein the cell associated with the changing the active UL BWP is the PCell or the SCell, wherein a first occasion of the PCell is before the changing the active UL BWP, wherein a second occasion of the SCell is before the changing the active UL BWP, and/or wherein the first occasion and the second occasion are associated with the first slot, (ii) to determine whether or not to include HARQ information, associated with the second occasion, in a HARQ codebook based on whether or not the SCell, associated with transmitting the HARQ codebook, is the same as the cell associated with the changing the active UL BWP, and (iii) to transmit, in the first slot and on the SCell, a PUCCH comprising the HARQ codebook. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 14-15. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 14-15, and/or one, some and/or all of the above-described actions and steps and/or others described herein.

It may be appreciated that applying one or more of the techniques presented herein may result in one or more benefits including, but not limited to, enabling a UE to transmit PUCCH on a carrier different than a primary carrier. For example, in case of a UL BWP change of primary carrier, the UE may transmit (and/or be scheduled to transmit) a PUCCH on the carrier. The PUCCH may comprise HARQ information associated with an occasion for DL reception (e.g., a PDSCH reception and/or a SPS PDSCH release) before the UL BWP change of primary carrier. Unnecessary HARQ withdraw could be avoided, thereby providing for increased efficiency of communication of the UE (with a network node, for example).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE) that is configured with one or more first Physical Uplink Control Channel (PUCCH) resources on a primary cell (PCell) and configured with one or more second PUCCH resources on a secondary cell (SCell), wherein the PCell and the SCell are associated with a PUCCH group, the method comprising:
    changing, before a first slot, an active uplink (UL) bandwidth part (BWP) of a cell, wherein:
        the cell associated with the changing the active UL BWP is the PCell or the SCell;
        a first occasion of the PCell is before the changing the active UL BWP;
        a second occasion of the SCell is before the changing the active UL BWP; and
        the first occasion and the second occasion are associated with the first slot;
    determining whether or not to include Hybrid Automatic Repeat request (HARQ) information, associated with the second occasion, in a HARQ codebook based on whether or not the SCell, associated with transmitting the HARQ codebook, is the same as the cell associated with the changing the active UL BWP; and
    transmitting, in the first slot and on the SCell, a PUCCH comprising the HARQ codebook.

2. The method of claim 1, wherein at least one of:
    based on a determination that the SCell associated with the transmitting the PUCCH is the same as the cell associated with the changing the active UL BWP, the UE does not include HARQ information, associated with the first occasion and the second occasion, in the HARQ codebook; or
    based on a determination that the SCell associated with the transmitting the PUCCH is different than the cell associated with the changing the active UL BWP, the UE includes HARQ information, associated with the second occasion, in the HARQ codebook and does not include HARQ information, associated with the first occasion, in the HARQ codebook.

3. The method of claim 1, wherein:
the UE is configured with a third cell without PUCCH resources in the PUCCH group;
the third cell is an another SCell;
a third occasion of the third cell is associated with the first slot; and
the third occasion is before the changing the active UL BWP.

4. The method of claim 3, wherein at least one of:
based on a determination that the SCell associated with the transmitting the PUCCH is the same as the cell associated with the changing the active UL BWP, the UE does not include HARQ information, associated with the third occasion, in the HARQ codebook; or
based on a determination that the SCell associated with the transmitting the PUCCH is different than the cell associated with the changing the active UL BWP, the UE includes HARQ information, associated with the third occasion, in the HARQ codebook.

5. The method of claim 3, wherein:
the first occasion is associated with at least one of a candidate Physical Downlink Shared Channel (PDSCH) reception in the PCell, a Semi-Persistent Scheduling (SPS) PDSCH release in the PCell, or a beam indication in the PCell;
the second occasion is associated with at least one of a candidate PDSCH reception in the SCell, a SPS PDSCH release in the SCell, or a beam indication in the SCell; and
the third occasion is associated with at least one of a candidate PDSCH reception in the third cell, a SPS PDSCH release in the third cell, or a beam indication in the third cell.

6. The method of claim 3, comprising:
determining that the first occasion, the second occasion and the third occasion are associated with the first slot based on information, indicated by one or more Downlink Control Informations (DCIs), for deriving the first slot.

7. The method of claim 3, wherein at least one of:
a size of the HARQ codebook is determined based on a measure of occasions of a first set of occasions, a measure of occasions of a second set of occasions, and a measure of occasions of a third set of occasions;
the first set of occasions comprises one or more occasions, associated with the first slot, on the PCell;
the second set of occasions comprises one or more occasions, associated with the first slot, on the SCell;
the third set of occasions comprises one or more occasions, associated with the first slot, on the third cell;
whether or not the first set of occasions comprises the first occasion is determined based on whether or not the SCell associated with the transmitting the PUCCH is the same as the cell associated with the changing the active UL BWP;
whether or not the second set of occasions comprises the second occasion is determined based on whether or not the SCell associated with the transmitting the PUCCH is the same as the cell associated with the changing the active UL BWP; or
whether or not the third set of occasions comprises the third occasion is determined based on whether or not the SCell associated with the transmitting the PUCCH is the same as the cell associated with the changing the active UL BWP.

8. The method of claim 7, wherein at least one of:
the HARQ codebook has a plurality of locations;
a location within the HARQ codebook corresponds to HARQ information; or
a location within the HARQ codebook is associated with an occasion of a plurality of occasions comprising the first set of occasions, the second set of occasions and the third set of occasions.

9. A User Equipment (UE), that is configured with one or more first Physical Uplink Control Channel (PUCCH) resources on a primary cell (PCell) and configured with one or more second PUCCH resources on a PUCCH-switching secondary cell (PUCCH-sSCell), wherein the PCell and the PUCCH-sSCell are associated with a PUCCH group, the UE comprising:
a control circuit;
a processor installed in the control circuit; and
a memory installed in the control circuit and operatively coupled to the processor, wherein the processor is configured to execute a program code stored in the memory to perform operations, the operations comprising:
changing, before a first slot, an active uplink (UL) bandwidth part (BWP) of a cell, wherein:
the cell associated with the changing the active UL BWP is the PCell or the PUCCH-sSCell;
a first occasion of the PCell is before the changing the active UL BWP;
a second occasion of the PUCCH-sSCell is before the changing the active UL BWP; and
the first occasion and the second occasion are associated with the first slot;
determining whether or not to include Hybrid Automatic Repeat request (HARQ) information, associated with the second occasion, in a HARQ codebook based on whether or not the PUCCH-sSCell, associated with transmitting the HARQ codebook, is the same as the cell associated with the changing the active UL BWP; and
transmitting, in the first slot and on the PUCCH-sSCell, a PUCCH comprising the HARQ codebook.

10. The UE of claim 9, wherein at least one of:
based on a determination that the PUCCH-sSCell associated with the transmitting the PUCCH is the same as the cell associated with the changing the active UL BWP, the UE does not include HARQ information, associated with the first occasion and the second occasion, in the HARQ codebook; or
based on a determination that the PUCCH-sSCell associated with the transmitting the PUCCH is different than the cell associated with the changing the active UL BWP, the UE includes HARQ information, associated with the second occasion, in the HARQ codebook and does not include HARQ information, associated with the first occasion, in the HARQ codebook.

11. The UE of claim 9, wherein:
the UE is configured with a third cell in the PUCCH group;
the third cell is a second SCell without PUCCH resources;
a third occasion of the third cell is associated with the first slot; and
the third occasion is before the changing the active UL BWP.

12. The UE of claim 11, wherein at least one of:
based on a determination that the PUCCH-sSCell associated with the transmitting the PUCCH is the same as the cell associated with the changing the active UL BWP, the UE does not include HARQ information, associated with the third occasion, in the HARQ codebook; or
based on a determination that the PUCCH-sSCell associated with the transmitting the PUCCH is different than the cell associated with the changing the active UL BWP, the UE includes HARQ information, associated with the third occasion, in the HARQ codebook.

13. The UE of claim 11, wherein:
the first occasion is associated with at least one of a candidate Physical Downlink Shared Channel (PDSCH) reception in the PCell, a Semi-Persistent Scheduling (SPS) PDSCH release in the PCell, or a beam indication in the PCell;
the second occasion is associated with at least one of a candidate PDSCH reception in the PUCCH-sSCell, a SPS PDSCH release in the PUCCH-sSCell, or a beam indication in the PUCCH-sSCell; and
the third occasion is associated with at least one of a candidate PDSCH reception in the third cell, a SPS PDSCH release in the third cell, or a beam indication in the third cell.

14. The UE of claim 11, the operations comprising:
determining that the first occasion, the second occasion and the third occasion are associated with the first slot based on information, indicated by one or more Downlink Control Informations (DCIs), for deriving the first slot.

15. The UE of claim 11, wherein at least one of:
a size of the HARQ codebook is determined based on a measure of occasions of a first set of occasions, a measure of occasions of a second set of occasions, and a measure of occasions of a third set of occasions;
the first set of occasions comprises one or more occasions, associated with the first slot, on the PCell;
the second set of occasions comprises one or more occasions, associated with the first slot, on the PUCCH-sSCell;
the third set of occasions comprises one or more occasions, associated with the first slot, on the third cell;
whether or not the first set of occasions comprises the first occasion is determined based on whether or not the PUCCH-sSCell associated with the transmitting the PUCCH is the same as the cell associated with the changing the active UL BWP;
whether or not the second set of occasions comprises the second occasion is determined based on whether or not the PUCCH-sSCell associated with the transmitting the PUCCH is the same as the cell associated with the changing the active UL BWP; or
whether or not the third set of occasions comprises the third occasion is determined based on whether or not the PUCCH-sSCell associated with the transmitting the PUCCH is the same as the cell associated with the changing the active UL BWP.

16. The UE of claim 15, wherein at least one of:
the HARQ codebook has a plurality of locations;
a location within the HARQ codebook corresponds to HARQ information; or
a location within the HARQ codebook is associated with an occasion of a plurality of occasions comprising the first set of occasions, the second set of occasions and the third set of occasions.

17. A non-transitory computer-readable medium comprising processor-executable instructions that when executed by a User Equipment (UE) cause performance of operations, wherein:
the UE is configured with one or more first Physical Uplink Control Channel (PUCCH) resources on a primary cell (PCell) and configured with one or more second PUCCH resources on a PUCCH-switching secondary cell (PUCCH-sSCell);
the PCell and the PUCCH-sSCell are associated with a PUCCH group; and
the operations comprise:
changing, before a first slot, an active uplink (UL) bandwidth part (BWP) of a cell, wherein:
the cell associated with the changing the active UL BWP is the PCell or the PUCCH-sSCell;
a first occasion of the PCell is before the changing the active UL BWP;
a second occasion of the PUCCH-sSCell is before the changing the active UL BWP; and
the first occasion and the second occasion are associated with the first slot;
determining whether or not to include Hybrid Automatic Repeat request (HARQ) information, associated with the second occasion, in a HARQ codebook based on whether or not the PUCCH-sSCell, associated with transmitting the HARQ codebook, is the same as the cell associated with the changing the active UL BWP; and
transmitting, in the first slot and on the PUCCH-sSCell, a PUCCH comprising the HARQ codebook.

18. The non-transitory computer-readable medium of claim 17, wherein at least one of:
based on a determination that the PUCCH-sSCell associated with the transmitting the PUCCH is the same as the cell associated with the changing the active UL BWP, the UE does not include HARQ information, associated with the first occasion and the second occasion, in the HARQ codebook; or
based on a determination that the PUCCH-sSCell associated with the transmitting the PUCCH is different than the cell associated with the changing the active UL BWP, the UE includes HARQ information, associated with the second occasion, in the HARQ codebook and does not include HARQ information, associated with the first occasion, in the HARQ codebook.

19. The non-transitory computer-readable medium of claim 17, wherein:
the UE is configured with a third cell in the PUCCH group;
the third cell is a second SCell without PUCCH resources;
a third occasion of the third cell is associated with the first slot; and
the third occasion is before the changing the active UL BWP.

20. The non-transitory computer-readable medium of claim 19, wherein at least one of:
based on a determination that the PUCCH-sSCell associated with the transmitting the PUCCH is the same as the cell associated with the changing the active UL BWP, the UE does not include HARQ information, associated with the third occasion, in the HARQ codebook; or based on a determination that the PUCCH-sSCell associated with the transmitting the PUCCH is different than the cell associated with the changing the active UL BWP, the UE includes HARQ information, associated with the third occasion, in the HARQ codebook.

\* \* \* \* \*